US009975997B2

(12) United States Patent
Jeon et al.

(10) Patent No.: US 9,975,997 B2
(45) Date of Patent: May 22, 2018

(54) COMPOSITIONS, COMPOSITES PREPARED THEREFROM, AND FILMS AND ELECTRONIC DEVICES INCLUDING THE SAME

(71) Applicant: SAMSUNG ELECTRONICS CO., LTD., Suwon-si, Gyeonggi-do (KR)

(72) Inventors: Hyunjeong Jeon, Seoul (KR); Min Sang Kim, Anseong-si (KR); Sang Soo Jee, Hwaseong-si (KR); Byunghee Sohn, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days. days.

(21) Appl. No.: 15/081,468

(22) Filed: Mar. 25, 2016

(65) Prior Publication Data
US 2016/0280857 A1 Sep. 29, 2016

(30) Foreign Application Priority Data

Mar. 27, 2015 (KR) .................. 10-2015-0043489
Mar. 23, 2016 (KR) .................. 10-2016-0034556

(51) Int. Cl.
*C08G 77/455* (2006.01)
*C08G 73/10* (2006.01)
*C08G 73/14* (2006.01)
*C08G 77/00* (2006.01)
*C08L 79/08* (2006.01)

(52) U.S. Cl.
CPC .......... *C08G 73/106* (2013.01); *C08G 73/10* (2013.01); *C08G 73/1007* (2013.01); *C08G 73/1017* (2013.01); *C08G 73/1039* (2013.01); *C08G 73/1067* (2013.01); *C08G 73/14* (2013.01); *C08G 77/455* (2013.01); *C08G 77/80* (2013.01); *C08L 79/08* (2013.01)

(58) Field of Classification Search
CPC ..... C08G 83/001; C08G 73/14; C08G 77/455
See application file for complete search history.

(56) References Cited

U.S. PATENT DOCUMENTS

| | | | |
|---|---|---|---|
| 4,014,834 A | 3/1977 | Coccannon | |
| 4,603,061 A | 7/1986 | St. Clair et al. | |
| 4,696,994 A | 9/1987 | Nakajima et al. | |
| 4,908,409 A | 3/1990 | Oikawa et al. | |
| 4,937,317 A | 6/1990 | Pratt et al. | |
| 5,473,040 A * | 12/1995 | Kunimune ........... | C08G 73/106 525/431 |
| 5,665,802 A | 9/1997 | Maki et al. | |
| 7,452,947 B2 | 11/2008 | Cramail et al. | |
| 8,242,299 B2 | 8/2012 | Shelekhov | |
| 8,372,504 B2 | 2/2013 | Bae et al. | |
| 8,399,593 B2 | 3/2013 | Jung et al. | |
| 8,426,550 B2 | 4/2013 | Sohn et al. | |
| 8,586,689 B2 | 11/2013 | Jung et al. | |
| 8,592,528 B2 | 11/2013 | Cho et al. | |
| 8,623,968 B2 | 1/2014 | Cho et al. | |
| 8,658,753 B2 | 2/2014 | Bae et al. | |
| 9,051,425 B2 | 6/2015 | Cho et al. | |
| 9,200,117 B2 | 12/2015 | Cho et al. | |
| 2006/0153763 A1 | 7/2006 | Cramail et al. | |
| 2010/0228002 A1 | 9/2010 | Sohn et al. | |
| 2011/0034581 A1 | 2/2011 | Bae et al. | |
| 2011/0207206 A1 | 8/2011 | Shelekhov | |
| 2012/0021234 A1 | 1/2012 | Fukukawa et al. | |
| 2013/0302586 A1 | 11/2013 | Sohn et al. | |
| 2013/0303691 A1 | 11/2013 | Cho et al. | |

FOREIGN PATENT DOCUMENTS

| | | |
|---|---|---|
| JP | 2005-240028 A | 9/2005 |
| JP | 2009-040850 A | 2/2009 |
| KR | 2010-0083697 A | 7/2010 |
| KR | 2011-0045779 A | 5/2011 |
| KR | 2011-0047859 A | 5/2011 |
| KR | 2011-0064749 A | 6/2011 |
| KR | 2011-0090652 A | 8/2011 |
| KR | 2011-0093177 A | 8/2011 |
| KR | 2012-0069382 A | 6/2012 |
| KR | 2012-0078346 A | 7/2012 |
| KR | 2012-0083798 A | 7/2012 |
| KR | 1228408 B1 | 1/2013 |
| KR | 2013-0091217 A | 8/2013 |
| KR | 2013-0125639 A | 11/2013 |
| KR | 2013-0125640 A | 11/2013 |
| KR | 1523730 B1 | 5/2015 |
| KR | 1524195 B1 | 5/2015 |

OTHER PUBLICATIONS

"Influence of Siloxane Composition and Morphology on Properties of Polyimide-Silica Hybrids" authored by Mascia et al. and published in Polymer (1995) 36(19), 3649-3659.*
Preparation and Properties of Ternary Polyimide/SiO2/Polydiphenylsiloxane Composite Films authored by Shang et al. and published in Polymer International (2006) 55(11), 1277-1282.*
US 9,163,118, 12/2000, Cho et al. (withdrawn)
"Manufacture and application at a sol-gel nano-hybrid material", Korean Journal of Ceramics, vol. 14, No. 3, (Jun. 2011), pp. 51-61 (W/English Translation).

(Continued)

*Primary Examiner* — Marc S Zimmer
(74) *Attorney, Agent, or Firm* — Cantor Colburn LLP

(57) ABSTRACT

A composition including a polyamic acid modified with an alkoxysilane group; and an oligo silica compound,
wherein the polyamic acid modified with an alkoxysilane group includes a reaction product of (i) a condensation reaction product of an acid anhydride and a diamine, and (ii) a reactive organosilane compound,
wherein the oligo silica compound includes a condensation reaction product of an organosilane diol and a an alkoxysilane compound,
wherein an amount of silicon atoms in the composition is less than or equal to about 15 wt % based on a total weight of solid contents in the composition.

22 Claims, 4 Drawing Sheets

(56) References Cited

OTHER PUBLICATIONS

Chaungi Choi et al. "Low Dielectric Constant Organic-Inorganic Hybride Materials by Non-Hydrolytic Sol-Gel Method", Electronic Materials Letters, vol. 1, No. 1 (2005) pp. 87-90.

F.L. Souza et al. "Sol-gel nonhydrolytic synthesis of a hybrid organic-inorganic electrolyte for application in lithium-ion devices", Solid State Ionics 166 (2004) 83-88.

Haitao Wang et al. "Polyimide/silica/titania nanohybrids via a novel non-hydrolytic sol-gel route", Composites Part A 36 (2005) 909-914.

Xiaomei Song et al. "PMMA-silica hybrid thin films with enhanced thermal properties prepared via a non-hydrolytic sol-gel process", Materials Chemistry and Physics 109 (2008) 143-147.

* cited by examiner

Example 4

Comparative Example 4

COMPOSITIONS, COMPOSITES PREPARED THEREFROM, AND FILMS AND ELECTRONIC DEVICES INCLUDING THE SAME

CROSS-REFERENCE TO RELATED APPLICATION

This application claims priority to Korean Patent Application Nos. 10-2015-0043489 and 10-2016-0034556 filed in the Korean Intellectual Property Office on Mar. 27, 2015 and Mar. 23, 2016, and all the benefits accruing therefrom under 35 U.S.C. § 119, the content of which is incorporated herein in its entirety by reference.

BACKGROUND

1. Field

Compositions, composites prepared therefrom, and films and electronic devices including the same are disclosed.

2. Description of the Related Art

A polyimide, which is a high performance polymer, includes a cyclic imide and an aromatic ring in a main chain. As polyimides have relatively superior thermal stability, mechanical properties, and optical properties, they are attractive for application in many advanced technology fields such as microelectronics, aviation, and separation technologies. For example, a polyimide may be applied in a transparent substrate (e.g., flexible substrate) or a flexible transparent protective film for various kinds of display devices and electronic devices such as a light emitting diode or a complementary metal oxide semiconductor sensor and the like. Thereby, there is a need to develop a polyimide-based material having improved optical properties such as yellow index and light transmittance, haze, or the like.

The polyimide-based material may be exposed to a high temperature during a process for a final product such as a display or an electronic device. For example, the production of an organic LED includes treating a substrate at a high temperature of greater than or equal to about 350° C. for a predetermined time in order to maintain primary characteristics of a panel. However, when the transparent polyimide substrate is heat-treated at a high temperature of greater than or equal to the glass transition temperature, the optical properties (light transmittance, haze, and yellow index) of the material may be significantly deteriorated. For example, the high temperature heating treatment may cause a packing phenomenon among chains or in the chain by moving polymer chains. As a result, a charge transfer complex (hereinafter referred to as CTC) may be formed, which is considered as one of the causes of material yellowing since it predominantly absorbs a visible ray of a low wavelength region. In addition, the polyimide substrate may show deteriorated mechanical properties after the heat treatment. Thereby, there is a need to develop a polyimide-based material capable of maintaining the original properties (e.g., mechanical properties and optical properties such as transmittance, yellow index, and the like) even after the high temperature process.

SUMMARY

An embodiment relates to a composition for preparing a polyimide composite having improved optical properties and being capable of maintaining original properties even after a high temperature treatment.

Another embodiment provides a polyimide composite film prepared from the composition.

Yet another embodiment provides an electronic device including the polyimide composite film.

In an embodiment, a composition includes a polyamic acid modified with an alkoxysilane group and an oligo silica compound wherein an amount of Si atoms in the composition may be less than or equal to about 15% based on the total weight of a solid content of the composition.

The polyamic acid modified with an alkoxysilane group includes a reaction product of (i) a condensation reaction product of an acid anhydride and a diamine, and (ii) a reactive organosilane compound. The oligo silica compound includes a condensation reaction product of organosilane diol and an alkoxysilane compound.

An amount of water in the composition may be less than or equal to 100 parts per million. For example, the composition does not substantially include water.

The condensation reaction product of an acid anhydride and a diamine may include a condensation polymerization product of an acid anhydride represented by Chemical Formula 1 and a diamine represented by Chemical Formula 2, and the condensation polymerization product of an acid anhydride and a diamine may have a residual group capable of reacting with the reactive organosilane compound at at least one terminal end.

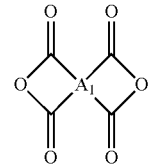

Chemical Formula 1

Herein, each $A_1$ is a residual group selected from a substituted or unsubstituted tetravalent C5 to C24 aliphatic cyclic group, a substituted or unsubstituted tetravalent C6 to C24 aromatic cyclic group, and a substituted or unsubstituted tetravalent C4 to C24 hetero aromatic cyclic group, wherein the aliphatic or (hetero) aromatic cyclic group is present alone; or two or more are fused to each other to provide a polycyclic ring; or two or more of the aliphatic cyclic group or two or more of the (hetero) aromatic cyclic group are linked through a single bond, —O—, —S—, —C(=O)—, —CH(OH)—, —S(=O)$_2$, —Si(CH$_3$)$_2$—, —(CH$_2$)$_p$— (wherein 1≤p≤10), —(CF$_2$)$_q$— (wherein 1≤q≤10), a C1 to C10 alkylene group having at least one substituent selected from a C1 to C10 linear or branched aliphatic hydrocarbon group, a C1 to C10 fluoroalkyl group, a C6 to C20 aromatic hydrocarbon group, and a C6 to C20 alicyclic hydrocarbon group, C(=O)NH, or a combination thereof.

NH$_2$-A$_2$-NH$_2$   Chemical Formula 2

Herein, $A_2$ is a residual group selected from a substituted or unsubstituted divalent C5 to C24 aliphatic cyclic group, a substituted or unsubstituted divalent C6 to C24 aromatic cyclic group, a substituted or unsubstituted divalent C4 to C24 hetero aromatic cyclic group, and -L-SiR$_2$—O—SiR$_2$-L (wherein L is a single bond or a C1 to C10 alkylene group), wherein the aliphatic or aromatic cyclic group is present alone; or two or more are fused to each other to provide a polycyclic ring; or two or more aliphatic rings or two or more aromatic rings are linked through a single bond, —O—, —S—, —C(=O)—, —CH(OH)—, —S(=O)$_2$, —Si(CH$_3$)$_2$—, —(CH$_2$)$_p$— (wherein 1≤p≤10), —(CF$_2$)$_q$— (wherein 1≤q≤10), a C1 to C10 divalent alkylene group having at least one substituent selected from a C1 to C10 linear or branched aliphatic hydrocarbon group, a C1 to C10 fluoroalkyl group, a C6 to C20 aromatic hydrocarbon group, and a C6 to C20 alicyclic hydrocarbon group, —C(=O)NH—, or a combination thereof.

A$_1$ in Chemical Formula 1 may be represented by any of chemical formulae:

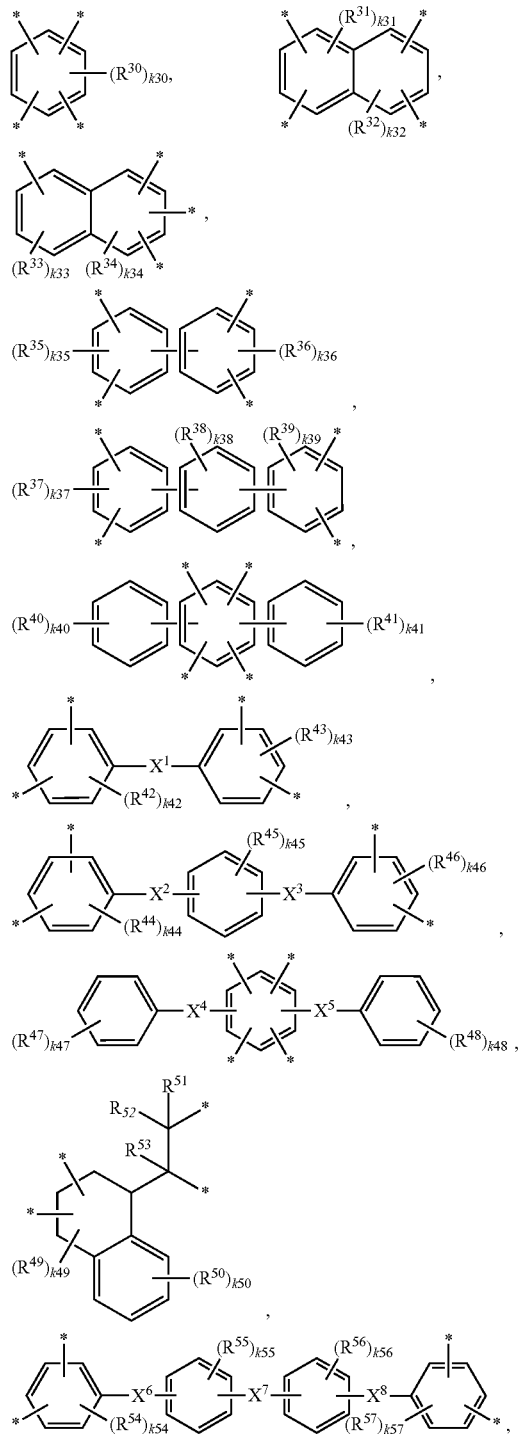

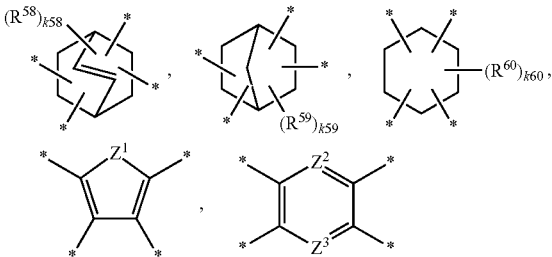

wherein,
X$^1$ to X$^8$ are the same or different and are independently a single bond, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, or —C(=O)NH—, Z$^1$ is —O—, —S—, or —NR$^{300}$—, wherein R$^{300}$ is hydrogen or a C1 to C5 alkyl group, Z$^2$ and Z$^3$ are the same or different and are independently —N= or —C(R$^{301}$)= wherein R$^{301}$ is hydrogen or a C1 to C5 alkyl group, provided that Z$^2$ and Z$^3$ are not simultaneously —C(R$^{301}$)=, R$^{30}$ to R$^{50}$ and R$^{54}$ to R$^{60}$ are the same or different and are independently halogen, a substituted or unsubstituted C1 to C10 aliphatic organic group, or a substituted or unsubstituted C6 to C20 aromatic organic group, R$^{51}$ to R$^{53}$ are the same or different and are independently hydrogen, a halogen, a substituted or unsubstituted C1 to C10 aliphatic organic group, or a substituted or unsubstituted C6 to C20 aromatic organic group, k30, k31, and k32 are independently integers ranging from 0 to 2, k33, k35, k36, k37, k39, k42, k43, k44, k46, k54, and k57 are independently integers ranging from 0 to 3, k34 is an integer of 0 or 1, k38, k45, k50, k55, and k56 are independently integers ranging from 0 to 4, k40, k41, k47, k48, and k49 are independently integers ranging from 0 to 5, and k58, k59, and k60 are independently integers ranging from 0 to 8.

A$_2$ in Chemical Formula 2 may be represented by any of chemical formulae:

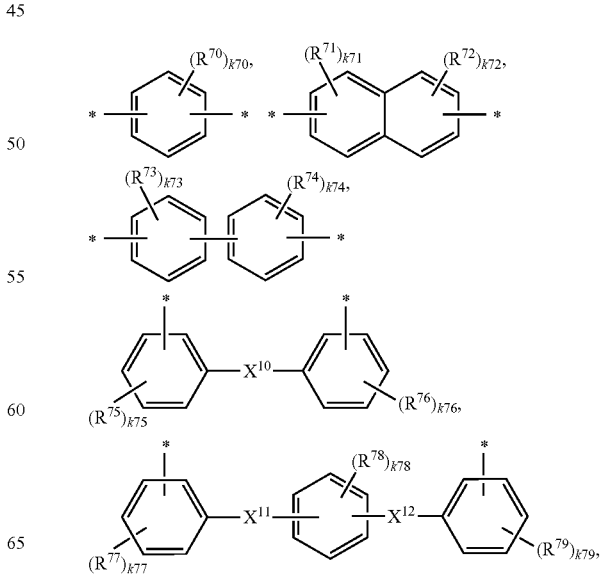

-continued

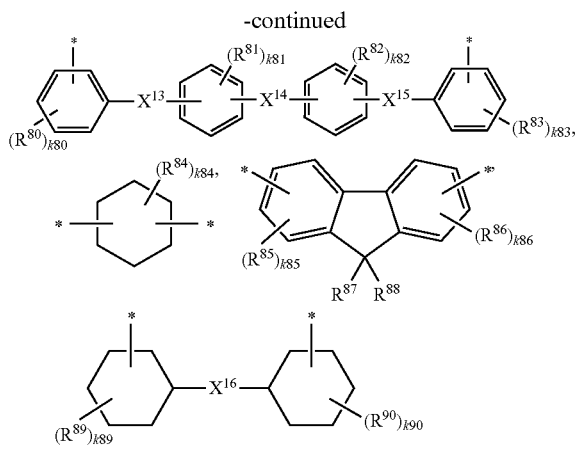

wherein, $X^{10}$ to $X^{16}$ are the same or different and are independently a single bond, —O—, —S—, —C(=O)—, —CH(OH)—, —S(=O)$_2$—, —Si(CH$_3$)$_2$—, —(CH$_2$)$_p$— wherein $1 \leq p \leq 10$, —(CF$_2$)$_q$— wherein $1 \leq q \leq 10$, —C(CH$_3$)$_2$—, —C(CF$_3$)$_2$—, or —C(=O)NH—, $R^{70}$ to $R^{86}$ and $R^{89}$ to $R^{90}$ are the same or different and are independently a halogen, a substituted or unsubstituted C1 to C10 aliphatic organic group, or a substituted or unsubstituted C6 to C20 aromatic organic group, $R^{87}$ and $R^{88}$ are the same or different and are independently hydrogen, a halogen, a substituted or unsubstituted C1 to C10 aliphatic organic group, or a substituted or unsubstituted C6 to C20 aromatic organic group, k70, k73, k74, k75, k76, k77, k78, k79, k80, k81, k82, and k83 are independently integers ranging from 0 to 4, k71, k72, k85, and k86 are independently integers ranging from 0 to 3, and k84, k89, and k90 are independently integers ranging from 0 to 10.

The condensation polymerization product of an acid anhydride and a diamine may include a condensation polymerization product of at least one acid anhydride selected from 3,3',4,4'-biphenyldianhydride, bicyclo[2.2.2]oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride, 4,4'-oxydiphthalic anhydride, pyromellitic dianhydride, 4-(2,5-dioxotetrahydrofuran-3-yl)-1,2,3,4-tetrahydronaphthalene-1,2-dicarboxylic anhydride, 1,2,4,5-benzene tetracarboxylic dianhydride, 1,2,3,4-benzene tetracarboxylic dianhydride, 1,4-bis(2,3-dicarboxyphenoxy)benzene dianhydride, 1,3-bis(3,4-dicarboxyphenoxy)benzene dianhydride, 1,2,4,5-naphthalene tetracarboxylic dianhydride, 1,2,5,6-naphthalene tetracarboxylic dianhydride, 1,4,5,8-naphthalene tetracarboxylic dianhydride, 2,3,6,7-naphthalene tetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, 2,2',3,3'-diphenyl tetracarboxylic dianhydride, 4,4'-bis(3,4-dicarboxyphenoxy)biphenyl dianhydride, bis(2,3-dicarboxylphenyl) ether dianhydride, 4,4'-bis(2,3-dicarboxyphenoxy)diphenylether dianhydride, 4,4'-bis(3,4-dicarboxyphenoxy)diphenylether dianhydride, bis(3,4-dicarboxylphenyl) sulfide dianhydride, 4,4'-bis(2,3-dicarboxyphenoxy)diphenylsulfide dianhydride, 4,4'-bis(3,4-dicarboxyphenoxy)diphenylsulfide dianhydride, bis(3,4-dicarboxylphenyl) sulfone dianhydride, 4,4'-bis(2,3-dicarboxyphenoxy)diphenylsulfone dianhydride, 4,4'-bis(3,4-dicarboxyphenoxy)diphenylsulfone dianhydride, 3,3',4,4'-benzophenone tetracarboxylic dianhydride, 2,2',3,3'-benzophenone tetracarboxylic dianhydride, 2,3,3'4'-benzophenone tetracarboxylic dianhydride, 4,4'-bis(3,4-dicarboxyphenoxy)benzophenone dianhydride, bis(2,3-dicarboxylphenyl) methane dianhydride, bis(3,4-dicarboxylphenyl) methane dianhydride, 1,1-bis(2,3-dicarboxylphenyl) ethane dianhydride, 1,1-bis(3,4-dicarboxylphenyl) ethane dianhydride, 1,2-bis(3,4-dicarboxylphenyl) ethane dianhydride, 2,2-bis(2,3-dicarboxylphenyl) propane dianhydride, 2,2-bis(3,4-dicarboxylphenyl) propane dianhydride, 2,2-bis[4-(2,3-dicarboxyphenoxy)phenyl]propane dianhydride, 2,2-bis[4-(3,4-dicarboxyphenoxy)phenyl]propane dianhydride, [4-(2,3-dicarboxyphenoxy)-4'-(3,4-dicarboxyphenoxy)diphenyl] propane dianhydride, 2,2-bis[4-(3,4-dicarboxyphenoxy-3,5-dimethyl)phenyl]propane dianhydride, 2,3,4,5-thiophene tetracarboxylic dianhydride, 2,3,5,6-pyrazine tetracarboxylic dianhydride, 1,8,9,10-phenanthrene tetracarboxylic dianhydride, 3,4,9,10-perylene tetracarboxylic dianhydride, 1,3-bis(3,4-dicarboxylphenyl)hexafluoropropane dianhydride, 1,1-bis(3,4-dicarboxylphenyl)-1-phenyl-2,2,2-trifluoroethane dianhydride, 2,2-bis[4-(3,4-dicarboxyphenoxy)phenyl]hexafluoropropane dianhydride, 1,1-bis[4-(3,4-dicarboxyphenoxy)phenyl]-1-phenyl-2,2,2-trifluoroethanedianhydride, and 4,4'-bis[2-(3,4-dicarboxylphenyl)hexafluoroisopropyl]diphenyl ether dianhydride, and a combination thereof, and at least one diamine selected from 2,2'-bis(trifluoromethyl)-4,4'-biphenyldiamine, m-phenylene diamine, p-phenylene diamine, 1,3-bis(4-aminophenyl) propane, 2,2-bis(4-aminophenyl) propane, 4,4'-diamino-diphenyl methane, 1,2-bis(4-aminophenyl) ethane, 1,1-bis(4-aminophenyl) ethane, 2,2'-diamino-diethyl sulfide, bis(4-aminophenyl) sulfide, 2,4'-diamino-diphenyl sulfide, bis(3-aminophenyl) sulfone, bis(4-aminophenyl) sulfone, 4,4'-diamino-dibenzyl sulfoxide, bis(4-aminophenyl) ether, bis(3-aminophenyl) ether, bis(4-aminophenyl)diethyl silane, bis(4-aminophenyl)diphenyl silane, bis(4-aminophenyl)ethyl phosphine oxide, bis(4-aminophenyl)phenyl phosphine oxide, bis(4-aminophenyl)-N-phenyl amine, bis(4-aminophenyl)-N-methylamine, 1,2-diamino-naphthalene, 1,4-diamino-naphthalene, 1,5-diamino-naphthalene, 1,6-diamino-naphthalene, 1,7-diamino-naphthalene, 1,8-diamino-naphthalene, 2,3-diamino-naphthalene, 2,6-diamino-naphthalene, 1,4-diamino-2-methyl-naphthalene, 1,5-diamino-2-methyl-naphthalene, 1,3-diamino-2-phenyl-naphthalene, 4,4'-diamino-biphenyl, 3,3'-diamino-biphenyl, 3,3'-dichloro-4,4'-diamino-biphenyl, 3,3'-dimethyl-4,4'-diamino-biphenyl, 2,2'-dimethyl-4,4'-diamino-biphenyl, 3,3'-dimethoxy-4,4'-diamino-biphenyl, 4,4'-bis(4-aminophenoxy)-biphenyl, 2,4-diamino-toluene, 2,5-diamino-toluene, 2,6-diamino-toluene, 3,5-diamino-toluene, 1,3-diamino-2,5-dichloro-benzene, 1,4-diamino-2,5-dichloro-benzene, 1-methoxy-2,4-diamino-benzene, 1,4-diamino-2-methoxy-5-methyl-benzene, 1,4-diamino-2,3,5,6-tetramethyl-benzene, 1,4-bis(2-methyl-4-amino-pentyl)-benzene, 1,4-bis(1,1-dimethyl-5-amino-pentyl)-benzene, 1,4-bis(4-aminophenoxy)-benzene, o-xylylene diamine, m-xylylene diamine, p-xylylene diamine, 3,3'-diamino-benzophenone, 4,4'-diamino-benzophenone, 2,6-diamino-pyridine, 3,5-diamino-pyridine, 1,3-diamino-adamantine, bis[2-(3-aminophenyl)hexafluoroisopropyl]diphenyl ether, 3,3'-diamino-1,1'-diadamantane, N-(3-aminophenyl)-4-aminobenzamide, 4-aminophenyl 3-aminobenzoate, 2,2-bis(4-aminophenyl) hexafluoropropane, 2,2-bis(3- aminophenyl) hexafluoropropane, 2-(3-aminophenyl)-2-(4-aminophenyl)hexafluoropropane, 2,2-bis[4-(4-aminophenoxy)phenyl]hexafluoropropane, 2,2-bis[4-(2-chloro-4-aminophenoxy)phenyl]hexafluoropropane, 1,1-bis(4-aminophenyl)-1-phenyl-2,2,2-trifluoroethane, 1,1-bis[4-(4-aminophenoxy)phenyl]-1-phenyl-2,2,2-trifluoroethane, 1,4-bis(3-aminophenyl) buta-1-ene-3-yne, 1,3-bis(3-aminophenyl) hexafluoropropane, 1,5-bis(3-aminophenyl) decafluoropentane, 4,4'-bis[2-(4-aminophenoxyphenyl) hexafluoroisopropyl]diphenyl ether, diaminocyclohexane, bicyclohexyldiamine, 4,4'-diaminodicyclohexylmethane, diaminofluorene, 1,1-bis(4-aminophenyl)cyclohexane, 4,4'-(hexafluoroisopropylidene)bis(p-phenyleneoxy)dianiline, 9,9-bis(4-aminophenyl)fluorene and a combination thereof, and the condensation reaction product of an acid anhydride and a diamine may have an anhydride residual group, an amine residual group, or both thereof at one terminal end or both terminal ends of the condensation reaction product.

The reactive organosilane compound may be a compound represented by Chemical Formula 3.

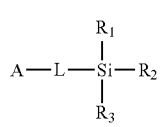

Chemical Formula 3

Herein,

L is a single bond, a substituted or unsubstituted C1 to C12 alkylene, a substituted or unsubstituted C6 to C30 arylene group, a substituted or unsubstituted C1 to C12 heteroalkylene group, or a combination thereof, A is —$NH_2$ or an acid anhydride group, and $R_1$, $R_2$, and $R_3$ are the same or different and each independently a C1 to C6 alkyl group or a C1 to C6 alkoxy group, provided that at least one of $R_1$, $R_2$, and $R_3$ is a C1 to C6 alkoxy group.

The reactive organosilane compound may be gamma-aminopropyltrimethoxysilane, aminophenyltrimethoxysilane, 3-(triethoxysilyl)propyl succinyl anhydride, or a combination thereof.

An amount of the reactive organosilane compound may be greater than or equal to about 0.01 moles and less than or equal to about 10 moles per 1 mole of the alkoxysilane compound.

The organosilane diol is represented by Chemical Formula 4.

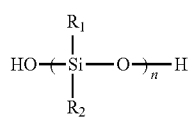

Chemical Formula 4

Herein, n is an integer of 1 to 10, and $R_1$ and $R_2$ are each independently a C1 to C20 alkyl group, a C3 to C8 cycloalkyl group, a C1 to C20 alkyl group substituted with a C3 to C8 cycloalkyl group, a C2 to C20 alkenyl group, a C2 to C20 alkynyl group, or a C6 to C20 aryl group.

The alkoxysilane compound may be tetramethoxysilane, tetraethoxysilane, or a combination thereof.

The condensation reaction product of the organosilane diol and the alkoxysilane compound may be obtained by a non-hydrolytic condensation reaction carried out in the presence of an alkaline-earth metal hydroxide.

An amount of the alkoxysilane compound may be about 2 to about 10 moles per 1 mole of the organosilane diol.

An amount of the oligo silica compound may be about 1 to about 10 parts by weight per 100 parts by weight of the polyamic acid modified with alkoxysilane.

In another embodiment, a polyimide composite includes a cured product of the composition. An amount of Si atoms in the polyimide composite may be less than or equal to about 15% based on the total weight of the composite. The amount of the Si atoms may be determined with a SEM/EDX analysis.

The cured product does not include a separated silica particle having a size of greater than or equal to about 200 nanometers when observed with a transmission electron microscope.

A content of Si atoms in the polyimide composite may be about 4% to about 14% based on the total weight of the composite.

The polyimide composite may have haze of less than or equal to about 1% and transmittance of greater than or equal to about 65% to light having a wavelength of about 430 nanometers.

The polyimide composite may have a coefficient of thermal expansion of less than or equal to about 150 parts per million per degree Centigrade obtained by heating a specimen of the composite from about 30° C. to about 400° C. at a rate of about 10 degrees Centigrade per minute under a load of about 0.05 Newtons.

In another embodiment, a film includes the polyimide composite.

In another embodiment, an electronic device includes the film.

The electronic device may be a flat panel display, a touch panel, a solar cell, an e-window, a heat mirror, a transparent transistor, a flexible display, a complementary metal oxide semiconductor sensor, or a light emitting diode illuminator.

In still another embodiment, a production method of polyimide composite includes:

preparing a polyamic acid by a reaction between an acid dianhydride and a diamine;

reacting the polyamic acid with a reactive organo silane compound to obtain a polyamic acid modified with an alkoxysilane group;

preparing an oligo silica compound by a non-hydrolytic condensation reaction between an organo silane diol and an alkoxy silane compound; and mixing the polyamic acid modified with an alkoxysilane group and the oligo silica compound and curing the same.

The polyimide composite prepared from the aforementioned composition may exhibit enhanced optical properties (e.g., light transmittance, yellow index, a haze, and the like). The aforementioned composition may provide the polyimide composite via a high temperature process without showing substantial deterioration of the properties of the obtained composite.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
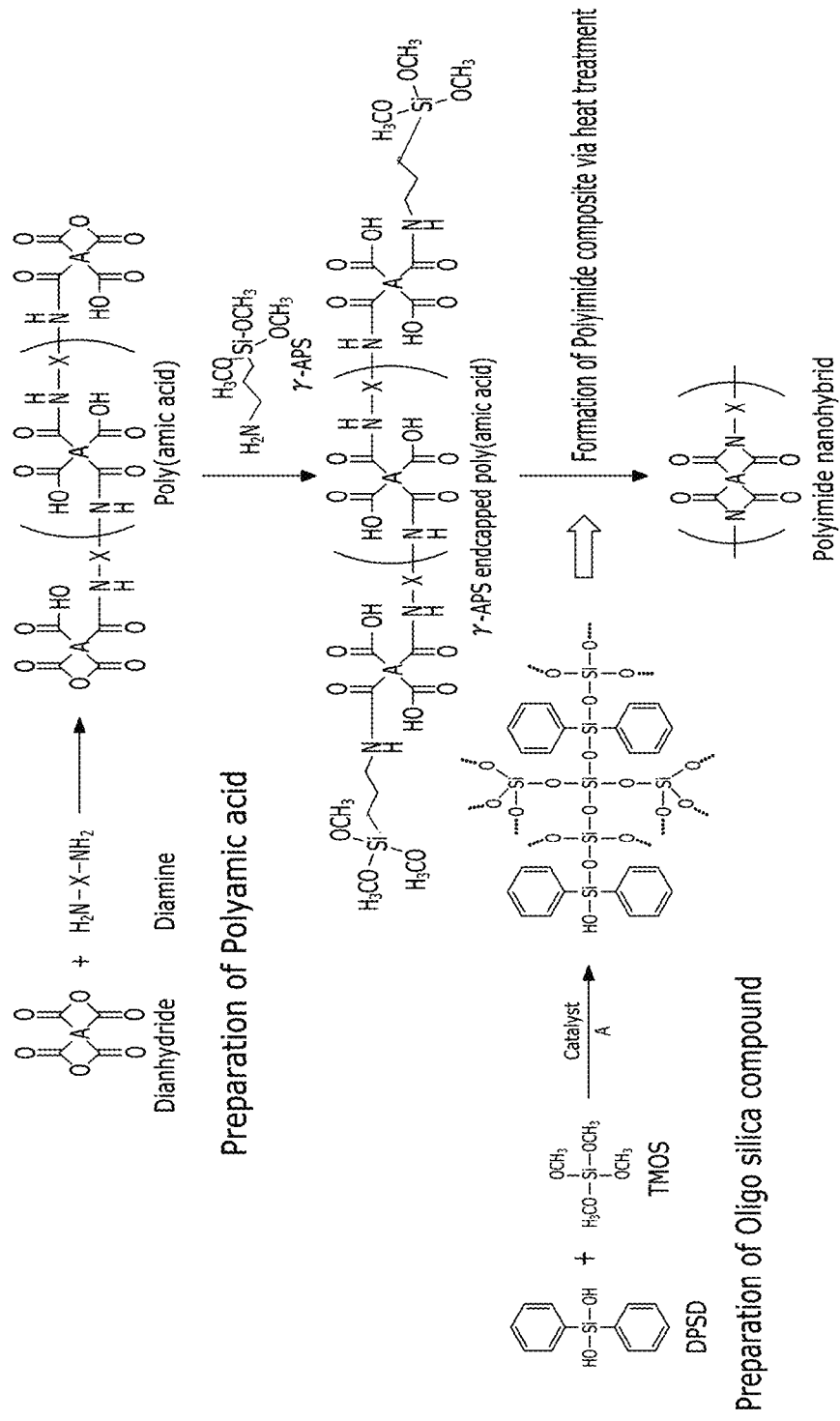
FIG. 1 is a schematic view showing a reaction scheme for preparing a polyimide composite according to a non-limiting embodiment.

Hereinafter, reference will be made to exemplary embodiments, examples of which are illustrated in the accompanying drawings, wherein like reference numerals refer to like elements throughout. However, these embodiments are exemplary, and this disclosure is not limited thereto. In this regard, the present exemplary embodiments may have different forms and should not be construed as being limited to the descriptions set forth herein. Accordingly, the exemplary embodiments are merely described below, by referring to the figures, to explain aspects of the present inventive concept. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when specific definition is not otherwise provided, the term "substituted" refers to one substituted with at least one substituent selected from —F, —Cl, —Br, or —I, a hydroxy group, a nitro group, a cyano group, an amino group ($NH_2$, $NH(R^{100})$, or $N(R^{101})(R^{102})$, wherein $R^{100}$, $R^{101}$, and $R^{102}$ are the same or different, and are independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group (e.g., a cycloalkyl group and the like), a substituted or unsubstituted aryl group (e.g., a benzyl group, a naphthyl group, a fluorenyl group, and the like), a substituted or unsubstituted alkenyl group, a substituted or unsubstituted alkynyl group, a substituted or unsubstituted heteroaryl group, and a substituted or unsubstituted heterocyclic group instead of at least one hydrogen of the given functional group or compound, and the substituents may be linked to each other to provide a ring.

As used herein, when specific definition is not otherwise provided, the term "alkyl group" refers to a C1 to C30 alkyl group, and specifically a C1 to C15 alkyl group, the term "cycloalkyl group" refers to a C3 to C30 cycloalkyl group, and specifically a C3 to C18 cycloalkyl group, the term "alkoxy group" refers to a C1 to C30 alkoxy group, and specifically a C1 to C18 alkoxy group, the term "ester group" refers to a C2 to C30 ester group, and specifically a C2 to C18 ester group, the term "ketone group" refers to a C2 to C30 ketone group, and specifically a C2 to C18 ketone group, the term "aryl group" refers to a C6 to C30 aryl group, and specifically a C6 to C18 aryl group, and the term "alkenyl group" refers to a C2 to C30 alkenyl group, and specifically a C2 to C18 alkenyl group.

As used herein, "alkylene" refers to a straight or branched chain, saturated, aliphatic hydrocarbon group having a valence of at least two, optionally substituted with one or more substituents where indicated, provided that the valence of the alkylene group is not exceeded.

As used herein, "arylene" refers to a divalent radical formed by the removal of two hydrogen atoms from one or more rings of an aromatic hydrocarbon, wherein the hydrogen atoms may be removed from the same or different rings (preferably different rings), each of which rings may be aromatic or non-aromatic.

As used herein, "heteroalkylene" group refers to an alkylene group that comprises at least one heteroatom covalently bonded to one or more carbon atoms of the alkylene group. Each heteroatom is independently chosen from nitrogen (N), oxygen (O), sulfur (S), and phosphorus (P).

As used herein, the term "reactive organosilane compound" refers to an organosilane compound having a functional group capable of reacting with a reactive functional group (e.g., an anhydride group or an amine group) of a condensation reaction product of an acid anhydride and a diamine.

As used herein, the term "polyamic acid modified with an alkoxysilane group" refers to "a polyamic acid that is modified to have an alkoxysilane group."

As used herein the term "alkoxysilane group" refers to a group derived from a silane having at least one (e.g., one, two, three, four etc.) alkoxy group (e.g., alkoxysilyl and the like).

As used herein, the term "silica" is not limited to SiO$_2$ but refers to a Si—O linkage based material. Depending on the context, the term "silica" may refer to an inorganic material represented by SiO$_x$ (x is about 1.5 to 2.5), a siloxane, and/or an organic material such as a silica or a siloxane including an organic substituent group (e.g., hydrogen, alkyl, aryl and the like).

A composition according to an embodiment includes a polyamic acid modified with an alkoxysilane group; and an oligo silica compound and the amount of the silicon atom is less than or equal to about 15 wt % based on a total weight of a solid content of the composition. The composition may not substantially include water. In some embodiments, an amount of water in the composition is equal to or less than about 100 parts per million. The amount of the water in the composition may be originated from the water content that may be included unavoidably (e.g., a trace amount of water included in a reactant or a solvent). As used herein, the term "solid content" is related to the amount of the polymer and in this case, it refers to the amount of the diamine and the dianhydride included in the solution. The amount of Si atom may be calculated from the amount of the components in the composition (or the amount of the reactant).

The polyamic acid modified with an alkoxysilane group includes a reaction product between (i) a condensation reaction product of an acid anhydride and a diamine, and (ii) a reactive organosilane compound, wherein the condensation reaction product of an acid anhydride and a diamine has a reactive functional group such as an anhydride group and/or an amine group and the like at one or both of its terminal ends (e.g., the condensation reaction product may be a polyamic acid having an anhydride group and/or an amine group at one or both of its terminal ends).

The acid anhydride may be represented by Chemical Formula 1.

Chemical Formula 1

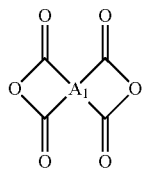

Herein, each A$_1$ is a residual group selected from a substituted or unsubstituted tetravalent C5 to C24 aliphatic cyclic group, a substituted or unsubstituted tetravalent C6 to C24 aromatic cyclic group, and a substituted or unsubstituted tetravalent C4 to C24 hetero aromatic cyclic group, wherein the aliphatic or (hetero) aromatic cyclic group is present alone; or two or more are fused to each other to provide a polycyclic (aromatic) ring; two or more of the aliphatic cyclic group or two or more of the (hetero) aromatic cyclic group are linked through a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), a C1 to C10 alkylene group having at least one substituent selected from a C1 to C10 linear or branched aliphatic hydrocarbon group, a C1 to C10 fluoroalkyl group, a C6 to C20 aromatic hydrocarbon group, and a C6 to C20 alicyclic hydrocarbon group, (for example, —CR$_2$— wherein R is independently hydrogen, a C1 to C10 aliphatic hydrocarbon group, a C6 to C20 aromatic hydrocarbon group, or a C6 to C20 alicyclic hydrocarbon group provided that R is not simultaneously hydrogen), C(=O)NH, or a combination thereof.

In Chemical Formula 1, A$_1$ may be represented by any of chemical formulae:

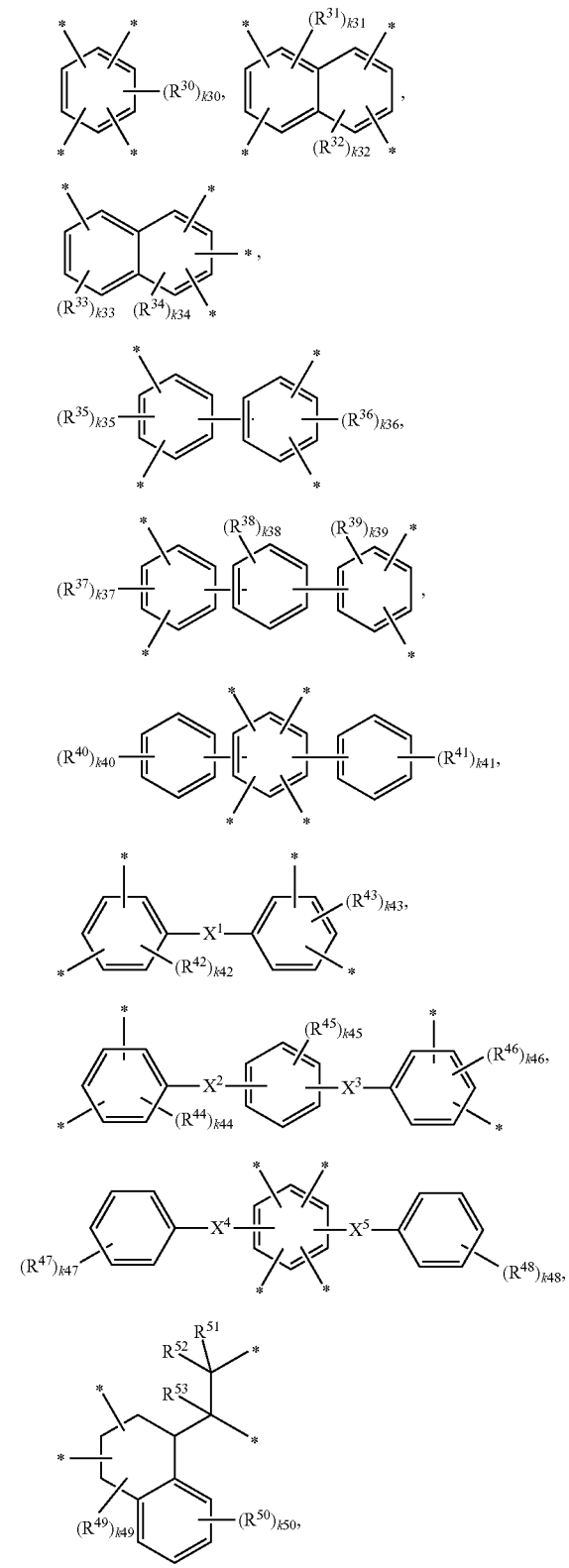

-continued

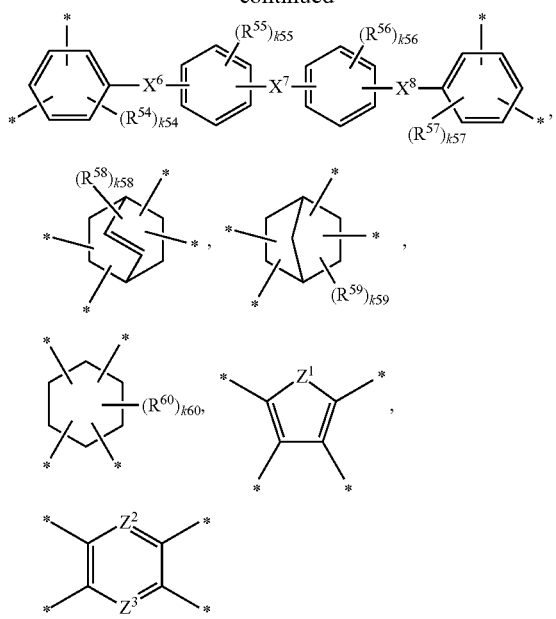

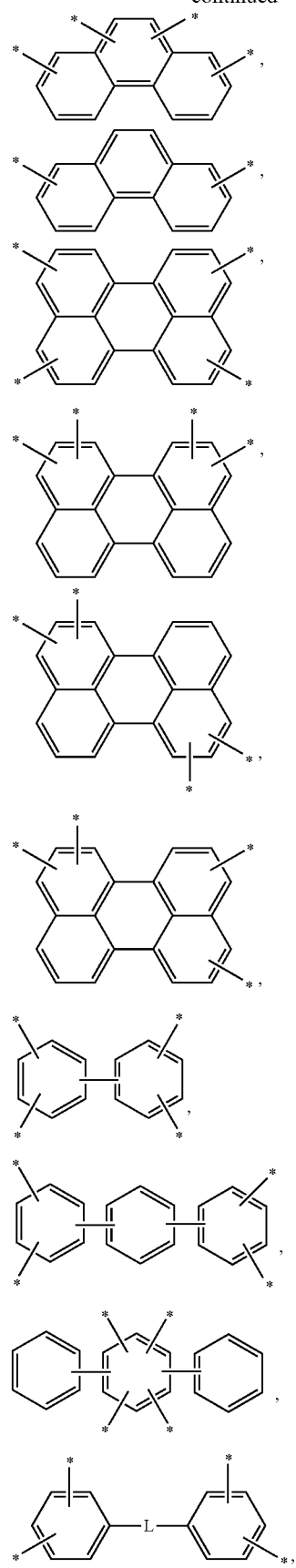

wherein,
X¹ to X⁸ are the same or different and are independently a single bond, —O—, —S—, —C(=O)—, —CH(OH)—, —S(=O)₂—, —Si(CH₃)₂—, —(CH₂)$_p$— wherein 1≤p≤10, —(CF₂)$_q$— wherein 1≤q≤10, —C(CH₃)₂—, —C(CF₃)₂—, or —C(=O)NH—, Z¹ is —O—, —S—, or —NR³⁰⁰—, wherein R³⁰⁰ is hydrogen or a C1 to C5 alkyl group, Z² and Z³ are the same or different and are independently —N= or —C(R³⁰¹)= wherein R³⁰¹ is hydrogen or a C1 to C5 alkyl group, provided that Z² and Z³ are not simultaneously —C(R³⁰¹)=, R³⁰ to R⁵⁰ and R⁵⁴ to R⁶⁰ are the same or different and are independently halogen, a substituted or unsubstituted C1 to C10 aliphatic organic group, or a substituted or unsubstituted C6 to C20 aromatic organic group, R⁵¹ to R⁵³ are the same or different and are independently hydrogen, a halogen, a substituted or unsubstituted C1 to C10 aliphatic organic group, or a substituted or unsubstituted C6 to C20 aromatic organic group, k30, k31, and k32 are independently integers ranging from 0 to 2, k33, k35, k36, k37, k39, k42, k43, k44, k46, k54, and k57 are independently integers ranging from 0 to 3, k34 is an integer of 0 or 1, k38, k45, k50, k55, and k56 are independently integers ranging from 0 to 4, k40, k41, k47, k48, and k49 are independently integers ranging from 0 to 5, and k58, k59, and k60 are independently integers ranging from 0 to 8.

In Chemical Formula 1, A₁ may be selected from the following groups.

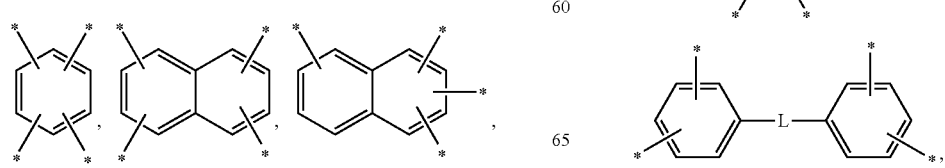

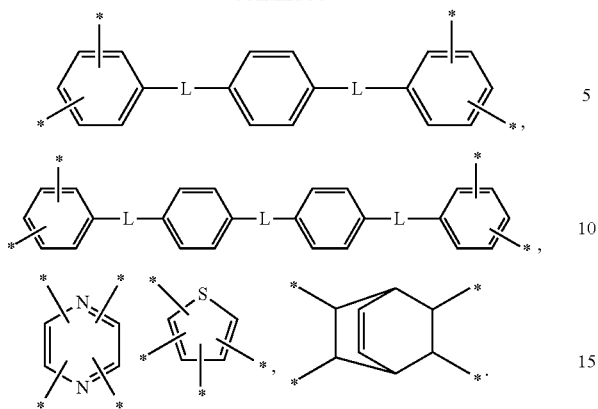

Herein, each L is the same or different, and is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —CR$_2$— (wherein each R is the same or different and is independently hydrogen, a C1 to C10 linear or branched aliphatic hydrocarbon group, a C6 to C20 aromatic hydrocarbon group, or a C6 to C20 alicyclic hydrocarbon group, provided that two groups R are not simultaneously hydrogen), —C(CF$_3$)$_2$—, —C(CF$_3$)(C$_6$H$_5$)—, or —C(=O)NH—, and the aromatic ring may be unsubstituted, or at least one hydrogen of the aromatic ring is substituted with a C1 to C15 alkyl group, —F, —Cl, —Br, —I, a C1 to C15 haloalkyl group, a C1 to C15 alkoxy group, a C6 to C12 aryl group, a C6 to C12 aryloxy group, a nitro group, a hydroxy group, or a combination thereof, and

* indicates a point where they are linked to carbon of the carbonyl group.

For example, A$_1$ may be selected from the following groups, but is not limited thereto.

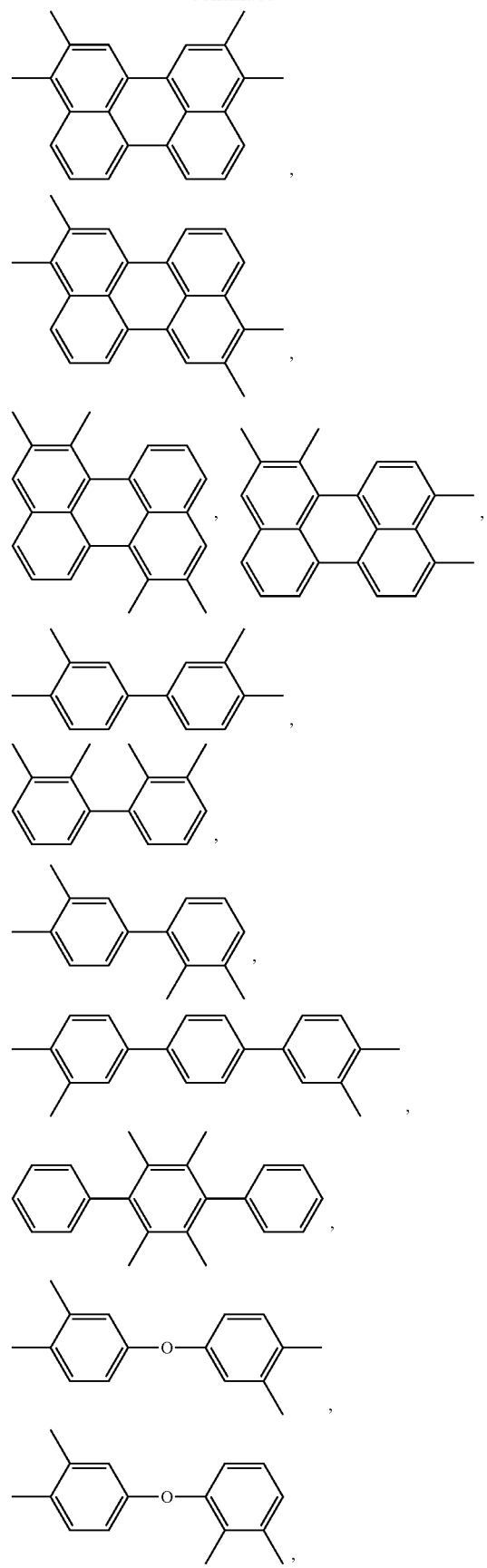

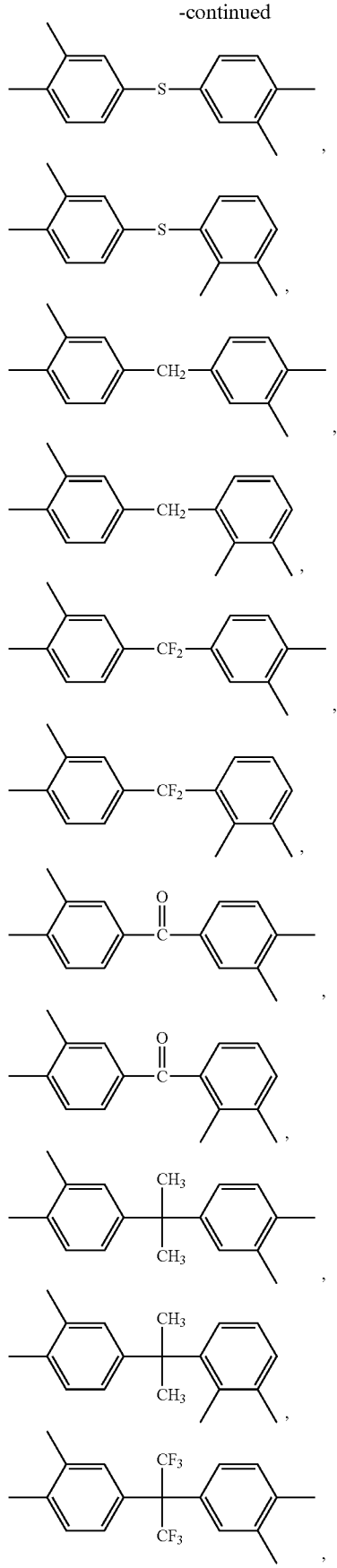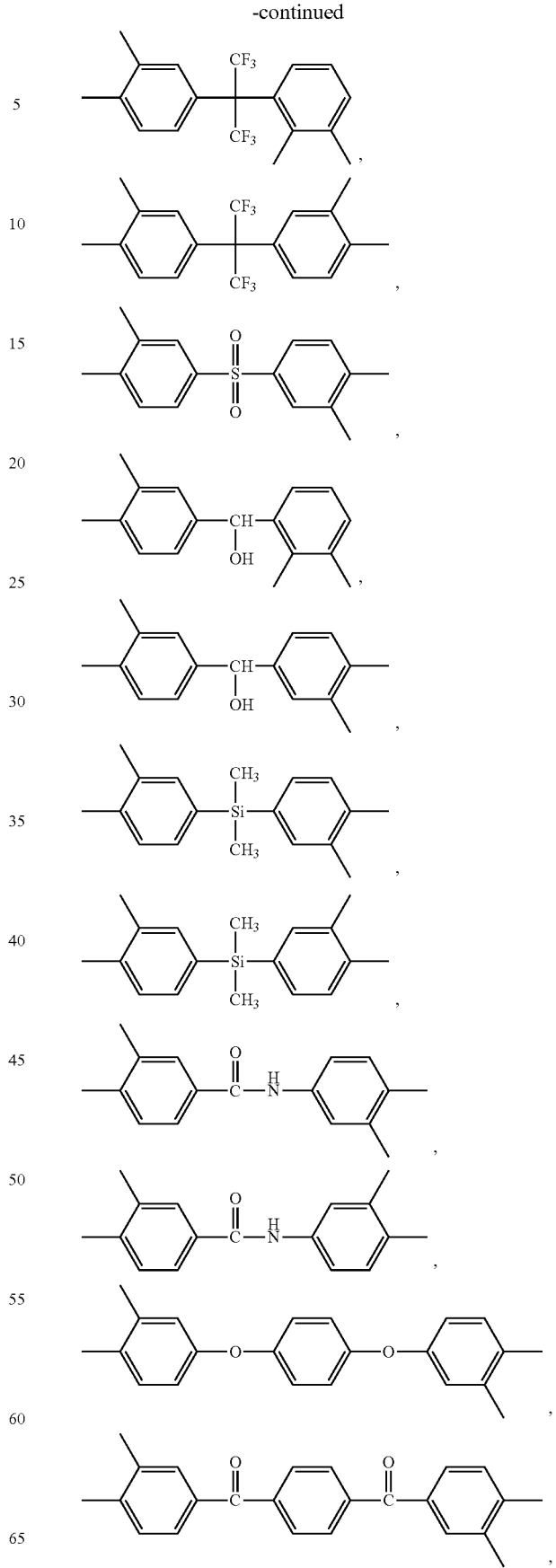

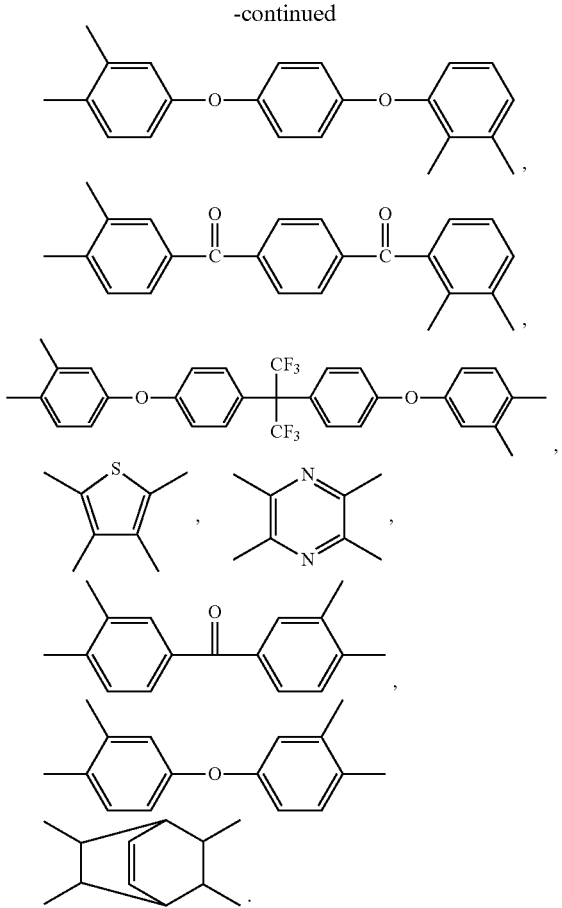

Non-limiting examples of the acid anhydride represented by Chemical Formula 1 may be 3,3',4,4'-biphenyl tetracarboxylic dianhydride (BPDA), bicyclo[2.2.2]oct-7-ene-2,3,5,6-tetracarboxylic dianhydride (BTDA), 3,3',4,4'-diphenylsulfone tetracarboxylic dianhydride (DSDA), 4,4'-(hexafluoroisopropylidene)diphthalic anhydride (6FDA), 4,4'-oxydiphthalic anhydride (ODPA), pyromellitic dianhydride (PMDA), 4-(2,5-dioxotetrahydrofuran-3-yl)-1,2,3,4-tetrahydronaphthalene-1,2-dicarboxylic anhydride (DTDA), 1,2,4,5-benzene tetracarboxylic dianhydride; 1,2,3,4-benzene tetracarboxylic dianhydride; 1,4-bis(2,3-dicarboxyphenoxy)benzene dianhydride; 1,3-bis(3,4-dicarboxyphenoxy)benzene dianhydride; 1,2,4,5-naphthalene tetracarboxylic dianhydride; 1,2,5,6-naphthalene tetracarboxylic dianhydride; 1,4,5,8-naphthalene tetracarboxylic dianhydride; 2,3,6,7-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; 2,2',3,3'-diphenyl tetracarboxylic dianhydride; 4,4'-bis(3,4-dicarboxyphenoxy)diphenyl dianhydride; bis(2,3-dicarboxylphenyl) ether dianhydride; 4,4'-bis(2,3-dicarboxyphenoxy)diphenylether dianhydride; 4,4'-bis(3,4-dicarboxyphenoxy)diphenylether dianhydride; bis(3,4-dicarboxylphenyl) sulfide dianhydride; 4,4'-bis(2,3-dicarboxyphenoxy)diphenylsulfide dianhydride; 4,4'-bis(3,4-dicarboxyphenoxy)diphenylsulfide dianhydride; bis(3,4-dicarboxylphenyl) sulfone dianhydride; 4,4'-bis(2,3-dicarboxyphenoxy)diphenylsulfone dianhydride; 4,4'-bis(3,4-dicarboxyphenoxy)diphenylsulfone dianhydride; 3,3',4,4'-benzophenone tetracarboxylic dianhydride; 2,2',3,3'-benzophenone tetracarboxylic dianhydride; 2,3,3'4'-benzophenone tetracarboxylic dianhydride, 4,4'-bis(3,4-dicarboxyphenoxy)benzophenone dianhydride; bis(2,3-dicarboxylphenyl) methane dianhydride; bis(3,4-dicarboxylphenyl) methane dianhydride; 1,1-bis(2,3-dicarboxylphenyl) ethane dianhydride; 1,1-bis(3,4-dicarboxylphenyl) ethane dianhydride; 1,2-bis(3,4-dicarboxylphenyl) ethane dianhydride; 2,2-bis(2,3-dicarboxylphenyl) propane dianhydride; 2,2-bis(3,4-dicarboxylphenyl) propane dianhydride; 2,2-bis[4-(2,3-dicarboxyphenoxy)phenyl]propane dianhydride; 2,2-bis[4-(3,4-dicarboxyphenoxy)phenyl]propane dianhydride; 4-(2,3-dicarboxyphenoxy)-4'-(3,4-dicarboxyphenoxy)diphenyl-2,2-propane dianhydride; 2,2-bis[4-(3,4-dicarboxyphenoxy-3,5-dimethyl)phenyl]propane dianhydride; 2,3,4,5-thiophene tetracarboxylic dianhydride; 2,3,5,6-pyrazine tetracarboxylic dianhydride; 1,8,9,10-phenanthrene tetracarboxylic dianhydride; 3,4,9,10-perylene tetracarboxylic dianhydride; 1,3-bis(3,4-dicarboxylphenyl)hexafluoropropane dianhydride; 1,1-bis(3,4-dicarboxylphenyl)-1-phenyl-2,2,2-trifluoroethane dianhydride; 2,2-bis[4-(3,4-dicarboxyphenoxy)phenyl]hexafluoropropane dianhydride; 1,1-bis[4-(3,4-dicarboxyphenoxy)phenyl]-1-phenyl-2,2,2-trifluoroethanedianhydride, and 4,4'-bis[2-(3,4-dicarboxylphenyl)hexafluoroisopropyl]diphenyl ether dianhydride. Such acid dianhydride monomers may be obtained by known methods or may be commercially available. The acid anhydride may be used alone or as a combination (for example, a mixture) of two or more acid anhydrides as needed.

The diamine may be represented by Chemical Formula 2.

$$NH_2-A_2-NH_2 \quad \text{Chemical Formula 2}$$

Herein, $A_2$ is a residual group selected from a substituted or unsubstituted divalent C5 to C24 aliphatic cyclic group, a substituted or unsubstituted divalent C6 to C24 aromatic cyclic group, a substituted or unsubstituted divalent C4 to C24 hetero aromatic cyclic group, and -L-SiR$_2$—O—SiR$_2$-L (wherein L is a single bond or a C1 to C10 alkylene group), wherein the aliphatic or aromatic cyclic group is present alone; or two or more are fused to each other to provide a polycyclic (aromatic) ring; or two or more aliphatic rings or two or more aromatic rings are linked through a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), a C1 to C10 divalent alkylene group having at least one substituent selected from a C1 to C10 linear or branched aliphatic hydrocarbon group, a C1 to C10 fluoroalkyl group, a C6 to C20 aromatic hydrocarbon group, and a C6 to C20 alicyclic hydrocarbon group, (for example, —CR$_2$— wherein R is independently hydrogen, a C1 to C10 aliphatic hydrocarbon group, a C6 to C20 aromatic hydrocarbon group, or a C6 to C20 alicyclic hydrocarbon group provided that R is not simultaneously hydrogen), —C(=O)NH—, or a combination thereof.

In Chemical Formula 2, $A_2$ may be represented by any of chemical formulae:

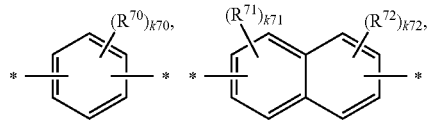

-continued

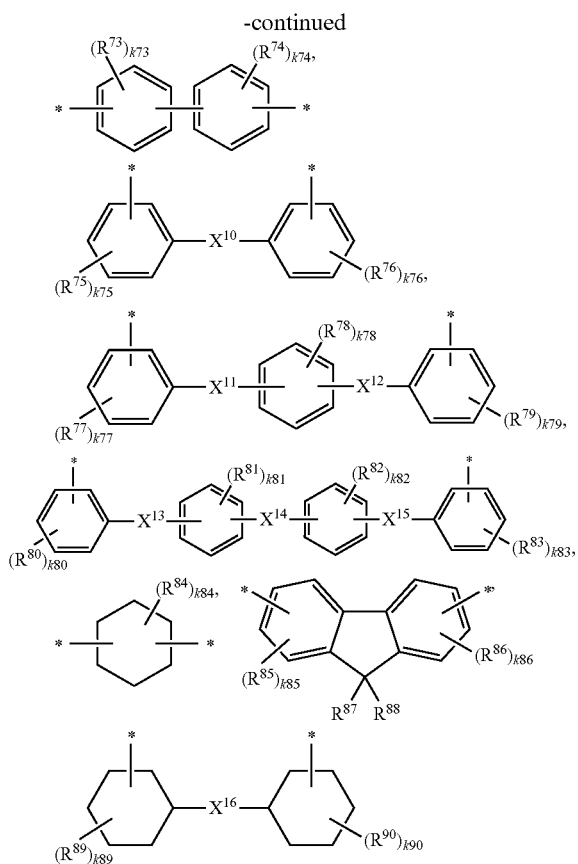

wherein, $X^{10}$ to $X^{16}$ are the same or different and are independently a single bond, —O—, —S—, —C(=O)—, —CH(OH)—, —S(=O)$_2$—, —Si(CH$_3$)$_2$—, —(CH$_2$)$_p$— wherein $1 \leq p \leq 10$, —(CF$_2$)$_q$— wherein $1 \leq q \leq 10$, —C(CH$_3$)$_2$—, —C(CF$_3$)$_2$—, or —C(=O)NH—, $R^{70}$ to $R^{86}$ and $R^{89}$ to $R^{90}$ are the same or different and are independently a halogen, a substituted or unsubstituted C1 to C10 aliphatic organic group, or a substituted or unsubstituted C6 to C20 aromatic organic group, $R^{87}$ and $R^{88}$ are the same or different and are independently hydrogen, a halogen, a substituted or unsubstituted C1 to C10 aliphatic organic group, or a substituted or unsubstituted C6 to C20 aromatic organic group, k70, k73, k74, k75, k76, k77, k78, k79, k80, k81, k82, and k83 are independently integers ranging from 0 to 4, k71, k72, k85, and k86 are independently integers ranging from 0 to 3, and k84, k89, and k90 are independently integers ranging from 0 to 10.

In Chemical Formula 2, A$_2$ may be selected from the following groups.

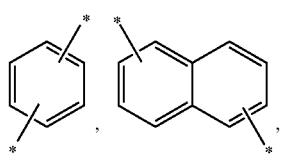

-continued

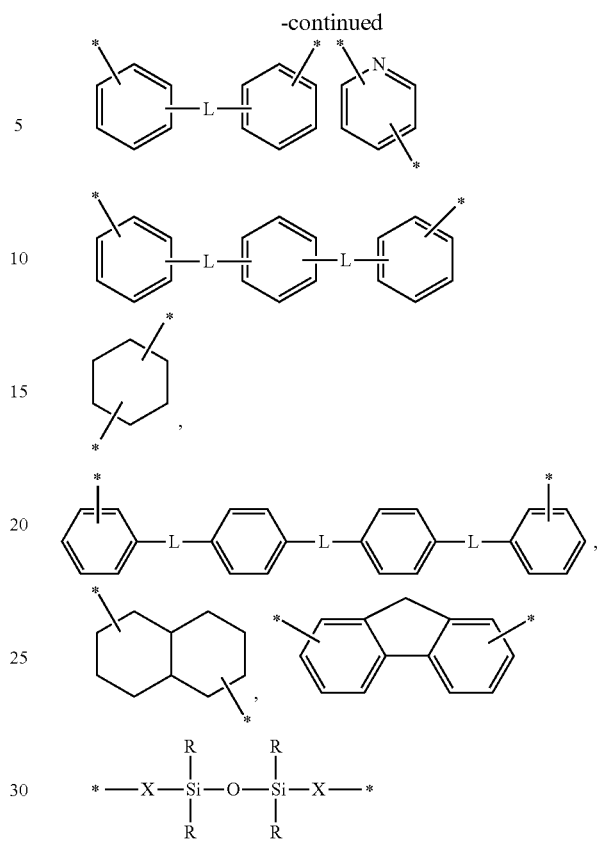

Herein, each L is the same or different, and is independently a single bond, —O—, —S—, —C(=O)—, —CH(OH)—, —S(=O)$_2$—, —Si(CH$_3$)$_2$—, —(CH$_2$)$_p$— (wherein $1 \leq p \leq 10$), —(CF$_2$)$_q$— (wherein $1 \leq q \leq 10$), —CR$_2$— (wherein each R is the same or different and is independently hydrogen, a C1 to C10 linear or branched aliphatic hydrocarbon group, a C6 to C20 aromatic hydrocarbon group, or a C6 to C20 alicyclic hydrocarbon group, provided that two groups R are not simultaneously hydrogen), —C(CF$_3$)$_2$—, —C(CF$_3$)(C$_6$H$_5$)—, or —C(=O)NH—, each X is the same or different and is independently a substituted or unsubstituted C1 to C10 alkylene group, a substituted or unsubstituted C4 to C20 cycloalkylene group, or a substituted or unsubstituted C6 to C20 arylene group, the aromatic or alicyclic ring may be unsubstituted, or at least one hydrogen of the aromatic or alicyclic ring is substituted with a C1 to C15 alkyl group, —F, —Cl, —Br, —I, a C1 to C15 haloalkyl group, a C1 to C15 alkoxy group, a C6 to C12 aryl group, a C6 to C12 aryloxy group, a nitro group, a hydroxy group, or a combination thereof, and

* indicates a point where they are linked to nitrogen.

The A$_2$ may be selected from the following groups, but is not limited thereto.

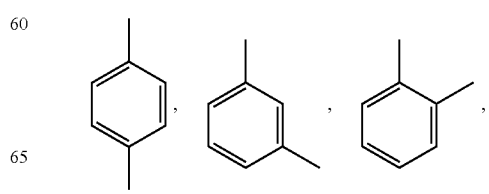

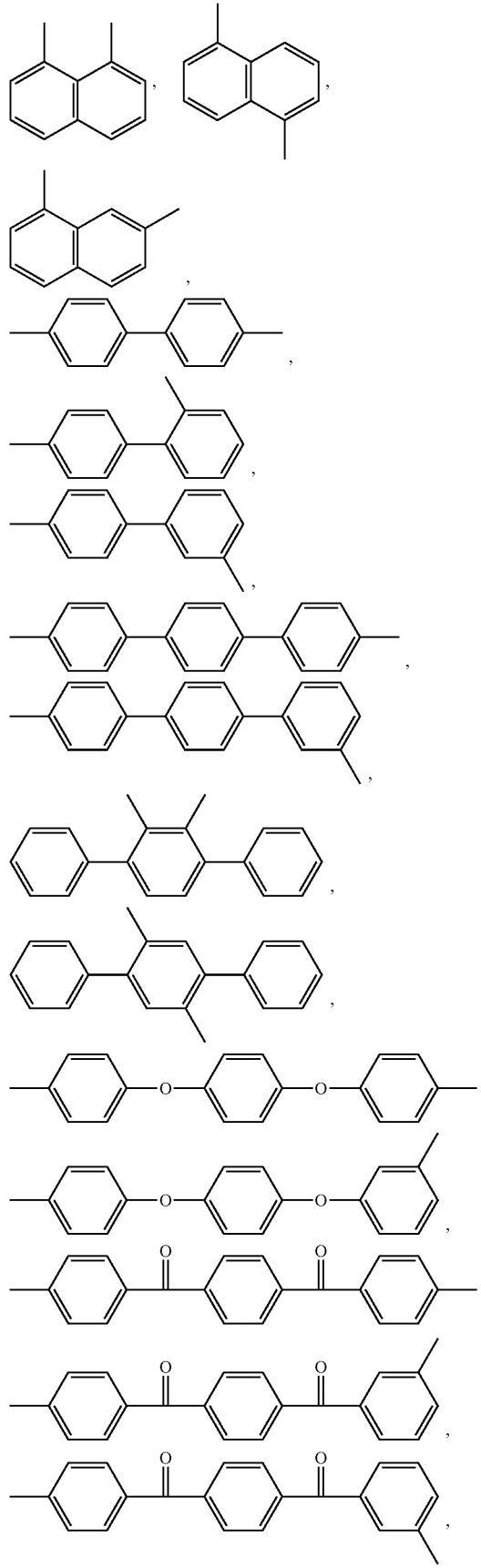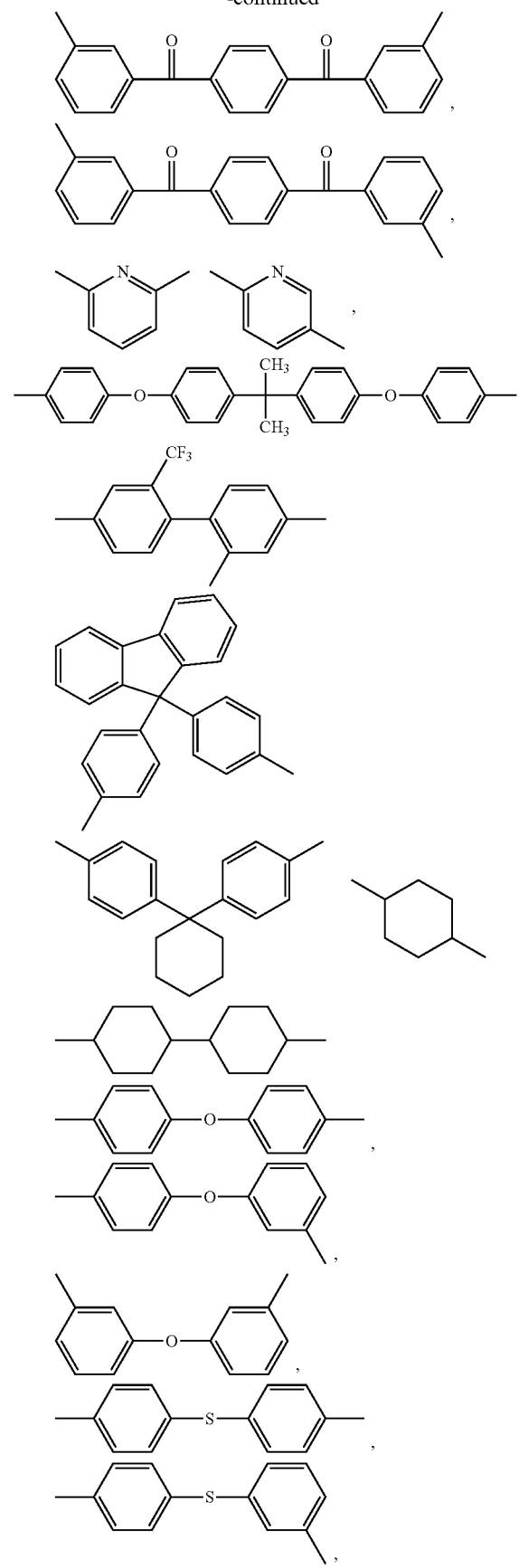

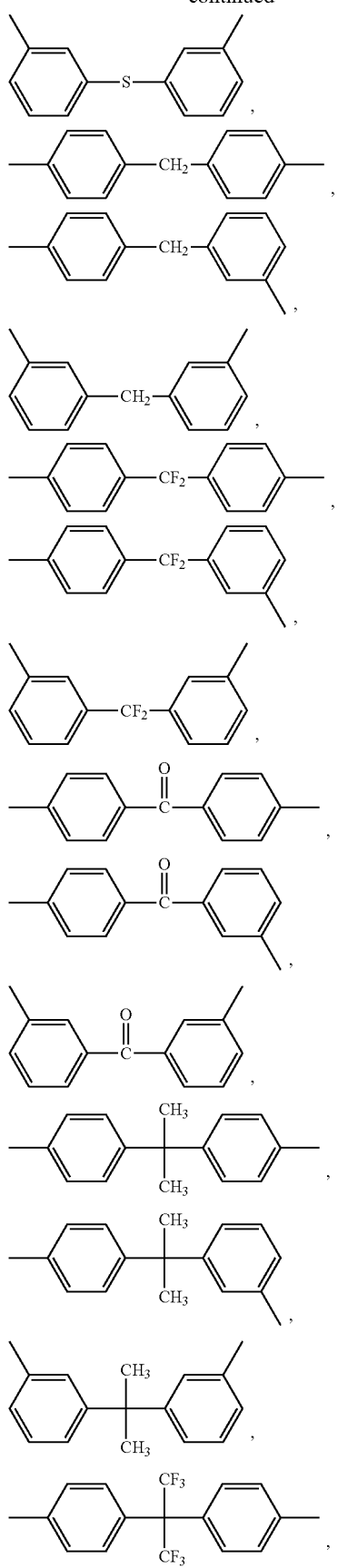
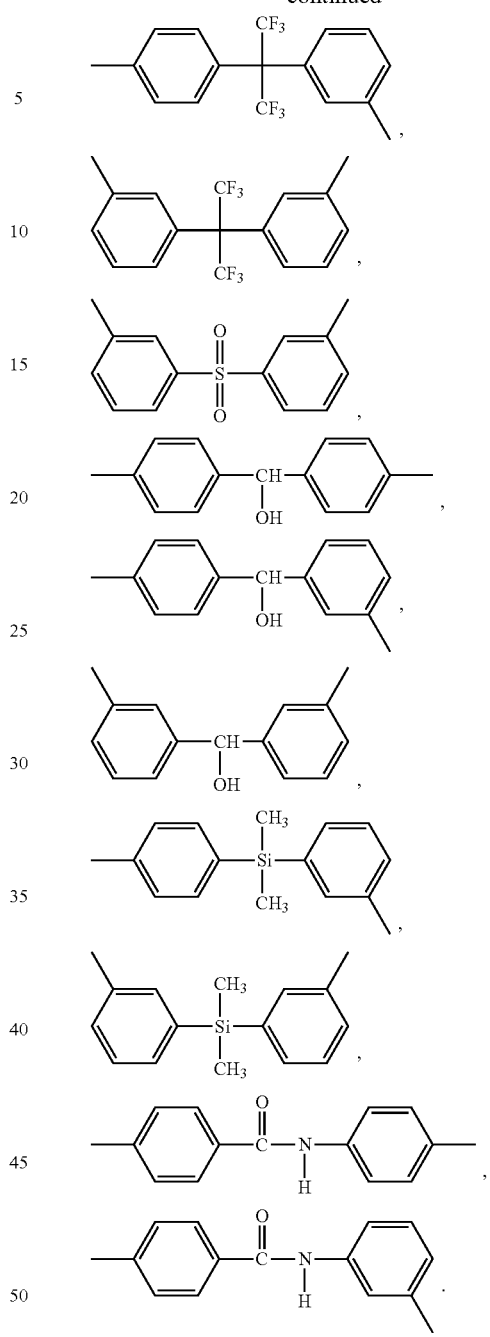
In an embodiment, the diamine may be one or more selected from the following compounds.
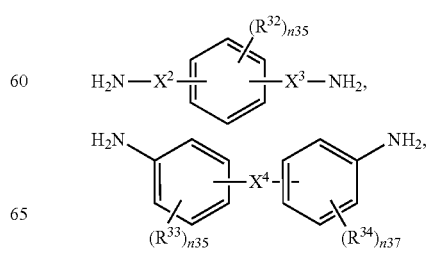

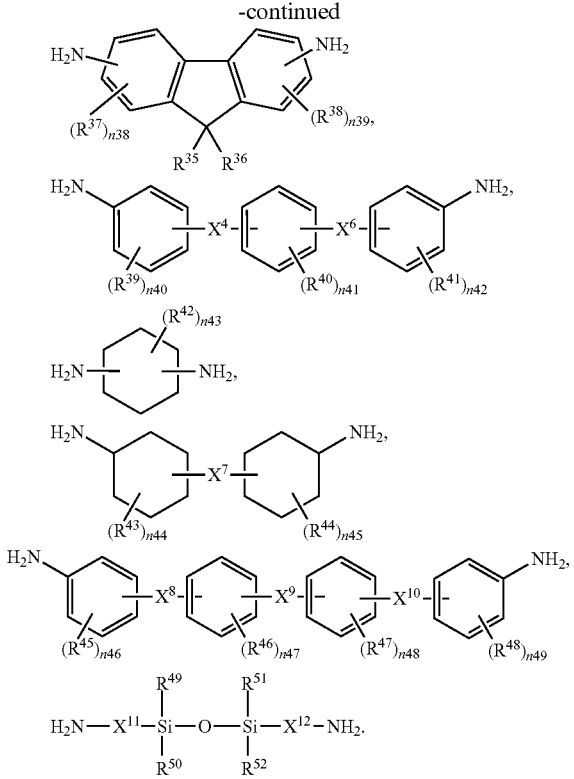

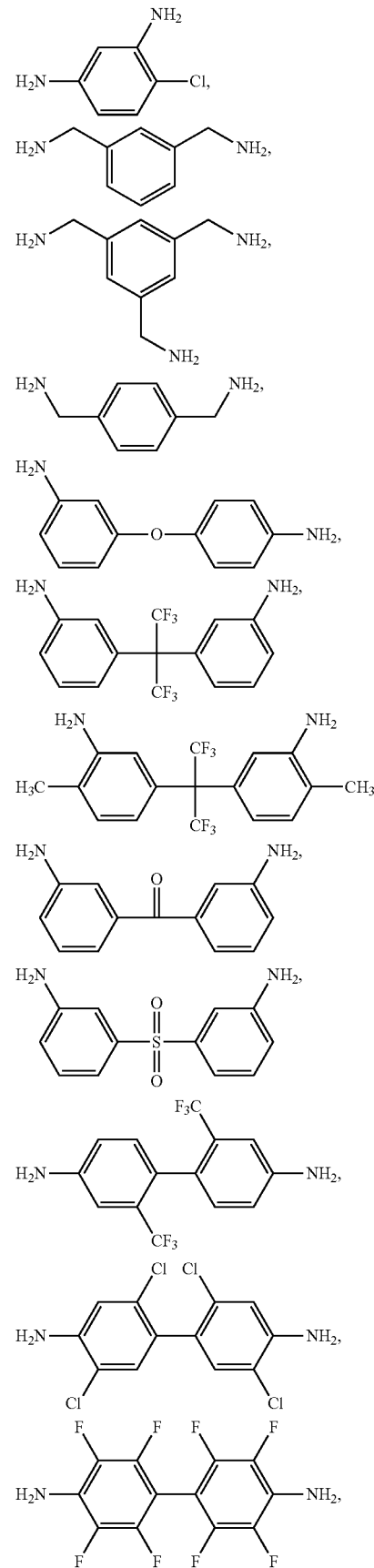

Herein, $R^{32}$ to $R^{52}$ are the same or different and are independently hydrogen, a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocyclo alkyl group, a substituted or unsubstituted C3 to C15 cycloalkyloxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different and are independently a single bond, a substituted or unsubstituted C1 to C10 alkylene group, a substituted or unsubstituted C1 to C10 cycloalkylene group, a substituted or unsubstituted C6 to C15 arylene group, $SO_2$, O, CO, or a combination thereof, n35 to n37 and n40 to n49 are an integer of 0 to 4, and n38 and n39 are an integer of 0 to 3.

In non-limiting examples, the diamine may be represented by the following chemical formulae.

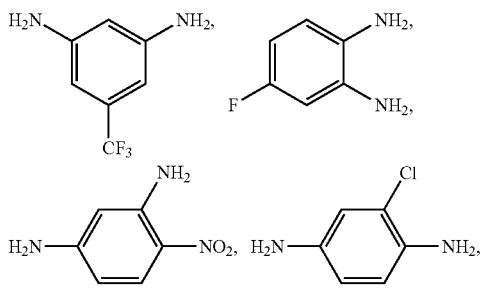

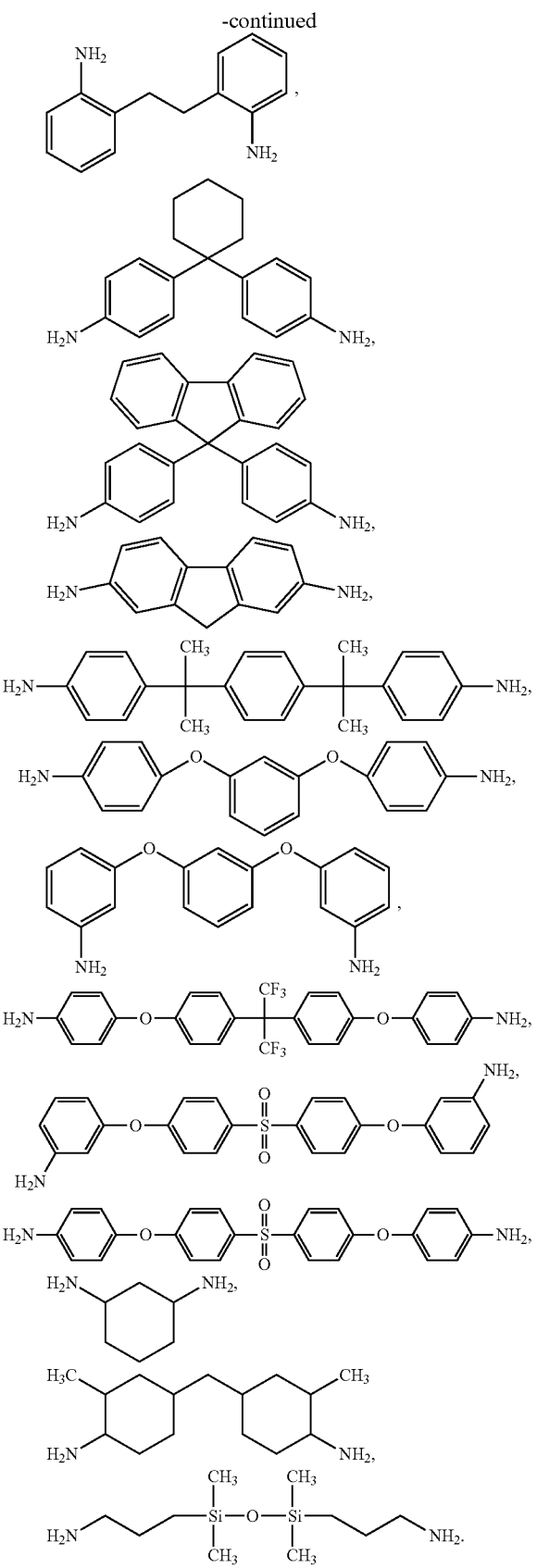

Examples of the diamine monomer may be m-phenylene diamine; p-phenylene diamine; 1,3-bis(4-aminophenyl) propane; 2,2-bis(4-aminophenyl) propane; 4,4'-diamino-diphenyl methane; 1,2-bis(4-aminophenyl) ethane; 1,1-bis(4-aminophenyl) ethane; 2,2'-diamino-diethyl sulfide; bis(4-aminophenyl) sulfide; 2,4'-diamino-diphenyl sulfide; bis(3-aminophenyl) sulfone; bis(4-aminophenyl) sulfone; 4,4'-diamino-dibenzyl sulfoxide; bis(4-aminophenyl) ether; bis(3-aminophenyl) ether; bis(4-aminophenyl)diethyl silane; bis(4-aminophenyl)diphenyl silane; bis(4-aminophenyl) ethyl phosphine oxide; bis(4-aminophenyl)phenyl phosphine oxide; bis(4-aminophenyl)-N-phenyl amine; bis(4-aminophenyl)-N-methylamine; 1,2-diamino-naphthalene, 1,4-diamino-naphthalene; 1,5-diamino-naphthalene, 1,6-diamino-naphthalene, 1,7-diamino-naphthalene; 1,8-diamino-naphthalene, 2,3-diamino-naphthalene; 2,6-diamino-naphthalene; 1,4-diamino-2-methyl-naphthalene, 1,5-diamino-2-methyl-naphthalene; 1,3-diamino-2-phenyl-naphthalene; 4,4'-diamino-biphenyl; 3,3'-diamino-biphenyl, 3,3'-dichloro-4,4'-diamino-biphenyl, 3,3'-dimethyl-4,4'-diamino-biphenyl, 3,4'-dimethyl-4,4'-diamino-biphenyl; 3,3'-dimethoxy-4,4'-diamino-biphenyl; 4,4'-bis(4-aminophenoxy)-biphenyl; 2,4-diamino-toluene; 2,5-diamino-toluene, 2,6-diamino-toluene; 3,5-diamino-toluene; 1,3-diamino-2,5-dichloro-benzene, 1,4-diamino-2,5-dichloro-benzene, 1-methoxy-2,4-diamino-benzene; 1,4-diamino-2-methoxy-5-methyl-benzene, 1,4-diamino-2,3,5,6-tetramethyl-benzene; 1,4-bis(2-methyl-4-amino-pentyl)-benzene 1,4-bis(1,1-dimethyl-5-amino-pentyl)-benzene; 1,4-bis(4-aminophenoxy)-benzene, o-xylylene diamine; m-xylylene diamine; p-xylylene diamine; 3,3'-diamino-benzophenone; 4,4'-diamino-benzophenone; 2,6-diamino-pyridine; 3,5-diamino-pyridine; 1,3-diamino-adamantine; bis[2-(3-aminophenyl)hexafluoroisopropyl]diphenyl ether; 3,3'-diamino-1, 1,1'-diadamantane, N-(3-aminophenyl)-4-aminobenzamide; 4-aminophenyl-3-aminobenzoate; 2,2-bis(4-aminophenyl) hexafluoropropane; 2,2-bis(3-aminophenyl) hexafluoropropane; 2-(3-aminophenyl)-2-(4-aminophenyl)hexafluoropropane, 2,2-bis[4-(4-aminophenoxy)phenyl]hexafluoropropane; 2,2-bis[4-(2-chloro-4-aminophenoxy)phenyl hexafluoropropane; 1,1-bis(4-aminophenyl)-1-phenyl-2,2,2-trifluoroethane, 1,1-bis[4-(4-aminophenoxy)phenyl]-1-phenyl-2,2,2-trifluoroethane, 1,4-bis(3-aminophenyl) buta-1-ene-3-yne; 1,3-bis(3-aminophenyl) hexafluoropropane; 1,5-bis(3-aminophenyl) decafluoropentane; and 4,4'-bis[2-(4-aminophenoxyphenyl) hexafluoroisopropyl]diphenyl ether, diaminocyclohexane, bicyclohexyldiamine, 4,4'-diaminocyclohexylmethane, 2,2'-bis(trifluoromethyl)benzidine (TFDB) and diaminofluorene, 1,1-bis(4-aminophenyl)cyclohexane (BACH), 4,4'-(hexafluoroisopropylidene) bis(4-phenoxyaniline) (6FIDDA), 9,9-bis(4-aminophenyl)fluorene (BAPF), and the like, but are not limited thereto. The diamine may be used alone or as a mixture of two or more as needed.

In an embodiment, the condensation reaction product of an acid anhydride and a diamine may include a condensation polymerization product of an acid anhydride selected from biphenyldianhydride (BPDA), bis(3,4-dicarboxylphenyl) hexafluoropropane dianhydride (6FDA), or a combination thereof and bis(trifluoromethyl)biphenyldiamine (TFDB).

The condensation polymerization may be performed by agitating the acid anhydride and the diamine at a predetermined temperature (e.g., less than or equal to about 50° C.) under an air atmosphere or an inert gas atmosphere. The conditions and the general mechanism of the condensation polymerization are known to one of ordinary skill in the art. The polymerization method is not particularly limited and may be appropriately chosen.

For example, the condensation polymerization may be selectively performed in a solution including a condensation polymerization catalyst. In the case of solution polymerization, the polymerization solvent may include any solvent known for preparing a polyamic acid. Examples of the solvent may be a dipolar aprotic solvent such as N-methyl pyrrolidone, dimethyl acetamide, dimethyl formamide, and dimethyl sulfoxide, gamma butyrolactone, monochlorobenzene, and the like, but are not limited thereto. Examples of the condensation polymerization catalyst may be para-toluenesulfonic acid, but are not limited thereto. In the polymerization solvent such as a dipolar aprotic solvent, when the given acid anhydride monomer is added into the given diamine monomer at a predetermined temperature, selectively, under the presence of a predetermined catalyst, a condensation reaction is carried out by nucleophilic attack of an amino group to a carbonyl carbon of an anhydride group. Time and temperature of polymerization may be appropriately selected depending upon the kind of the monomer used. For example, the polymerization may be performed at a temperature of less than or equal to about 50° C., for example, of −20° C. to 30° C., for greater than or equal to about 30 minutes, for example, for greater than or equal to about 1 hour. The monomer concentration in the solution may be appropriately selected, and may not be particularly limited. The acid anhydride and the diamine monomer may be readily prepared according to the known synthesis method, or may be commercially available in the market. By adjusting a molar ratio of acid anhydride to diamine (acid anhydride/diamine), the condensation polymerization product may have an anhydride residual group at one terminal end or both terminal ends. For example, the content of acid anhydride may range from about 0.8 to about 0.99, for example, from about 0.9 to about 0.97, per 1 mole of diamine.

The condensation polymerization product (e.g., polyamic acid) having a reactive functional group (e.g., anhydride and/or amine residual group) at one terminal end or both terminal ends reacts with the reactive organosilane compound to obtain a polyamic acid modified with an alkoxysilane group. According to non-limiting examples, referring to FIG. 1, the reactive functional group (e.g., amino group) of the reactive organosilane compound may be reacted with the anhydride group of the condensation polymerization product to obtain a polyamic acid having an alkoxysilane group.

The reactive organosilane compound may be a compound represented by Chemical Formula 3.

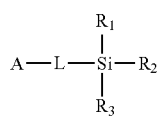

Chemical Formula 3

Herein,

L is a single bond, a substituted or unsubstituted C1 to C10 alkylene, a substituted or unsubstituted C6 to C30 arylene group, a substituted or unsubstituted C1 to C12 heteroalkylene group, or a combination thereof, A is —NH$_2$ or an acid anhydride group, and R$_1$, R$_2$, and R$_3$ are the same or different and each independently a C1 to C6 alkyl group or a C1 to C6 alkoxy group, provided that at least one of R$_1$, R$_2$, and R$_3$ is a C1 to C6 alkoxy group.

Examples of the reactive organosilane compound may include gamma-aminopropyltri methoxysilane, aminophenyltrimethoxysilane, and 3-(triethoxysilyl)propyl succinyl anhydride, but are not limited thereto.

Reaction conditions between the reactive organosilane compound and the condensation polymerization product are not particularly limited. For example, aminoalkoxy silane and polyamic acid may be agitated at a temperature of less than or equal to about 100° C., for example, less than or equal to about 50° C., or less than or equal to about 30° C. in an arbitrary solvent (e.g., dimethyl acetamide (DMAc)) to obtain polyamic acid modified with an alkoxysilane group.

An amount of the reactive organosilane compound may be appropriately determined considering an amount of the polyamic acid having a reactive functional group (e.g., anhydride group or an amine group) at one terminal end or both terminal ends, and an amount of an alkoxysilane compound of the oligo silica compound that will be described later. For example, the amount of the reactive organosilane compound may be about 1 to about 1.5 moles per 1 mole of a reactive functional group (anhydride or amine residual group) of polyamic acid, but is not limited thereto. For example, an amount of the reactive organosilane compound (e.g., aminoalkoxy silane compound) may be about 0.01 to about 10 moles, for example, about 0.1 moles to about 3 moles, about 0.5 moles to about 2 moles, or about 0.8 moles to about 1.5 moles per 1 mole of an alkoxysilane compound of the oligo silica compound, but is not limited thereto.

The polyamic acid modified with an alkoxysilane group may react with a hydroxy group or an alkoxy group of the oligo silica compound. The oligo silica compound may include a condensation reaction product of organosilane diol and an alkoxysilane compound. The alkoxy silane compound may include a monoalkoxy silane, dialkoxy silane, trialkoxy silane, tetraalkoxy silane, or a combination thereof. In an embodiment, the oligo silica compound is prepared by a non-hydrolytic condensation reaction, and the prepared oligo silica compound is mixed with the condensation polymerization product to obtain a composition.

The organosilane diol is represented by Chemical Formula 4.

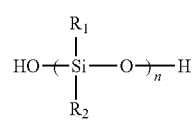

Chemical Formula 4

Herein, n is an integer of 1 to 10, and R$_1$ and R$_2$ are each independently a C1 to C20 alkyl group, a C3 to C8 cycloalkyl group, a C1 to C20 alkyl group substituted with a C3 to C8 cycloalkyl group, a C2 to C20 alkenyl group, a C2 to C20 alkynyl group, or a C6 to C20 aryl group.

For example, the silane diol may be diphenylsilanediol, diisobutylsilanediol, silanol-terminated polydimethylsiloxane, silanol-terminated polydimethylsiloxane, a silanol-terminated diphenylsiloxane-dimethylsiloxane copolymer, silanol-terminated polydiphenylsiloxane, silanol-terminated polydiphenylsiloxane, silanol-terminated polytrifluoropropylmethylsiloxane, or a mixture thereof. When the silane diol is diphenylsilanediol, an optically transparent oligo silica compound solution may be obtained. The alkoxysilane compound may be tetramethoxysilane, tetraethoxysilane, or a mixture thereof. For the transparency of the oligo silica compound or the improved optical properties of the obtained composite, the amount of alkoxysilane compound may be about 2 to about 10 moles per 1 mole of the organosilane diol. The non-hydrolytic condensation reaction using only alkoxysilane compound may provide an opaque oligo silica compound; on the other hand, when including the alkoxysilane compound and the silane diol in the above-mentioned amount, a clear viscous solution including the oligo silica compound may be obtained by controlling, for example, a rate of non-hydrolytic sol-gel reaction.

The condensation reaction of the organosilane diol and the alkoxysilane compound may be a non-hydrolytic condensation reaction, for example, a non-hydrolytic sol-gel reaction carried out in the presence of an alkaline-earth metal hydroxide. In other words, according to the present embodiment, the composition for preparing a polyimide composite does not include water.

The composition including the oligo silica compound obtained from the hydrolytic condensation reaction needs a large amount of silica for improving optical properties (e.g., transmittance). When including the large amount of silica, the mechanical property of final composite is unavoidably deteriorated, for example, the brittleness increase of the final composite is significant.

On the contrary, even when the composition including an organo silica precursor obtained from the non-hydrolytic sol-gel reaction includes a less amount of silica, the obtained composite may have improved optical properties (e.g., increased light transmittance and decreased yellow index). In a composition according to an embodiment, an amount of the oligo silica compound may be greater than or equal to about 1 part by weight, for example, greater than or equal to about 2 parts by weight, greater than or equal to about 3 parts by weight, or greater than or equal to about 4 parts by weight per 100 parts by weight of the polyamic acid modified with the alkoxysilane group. For example, an amount of the oligo silica compound may be less than or equal to about 15 parts by weight, for example, less than or equal to about 14.5 parts by weight, or less than or equal to about 14 parts by weight per 100 parts by weight of the polyamic acid modified with the alkoxysilane group. Even by adding the small amount of oligo silica compound, it may attempt to improve optical properties, so it may provide a composite with improved quality while minimizing the influence of the silica particle on the mechanical properties such as brittleness.

On the other hand, in the case of a hydrolytic sol-gel reaction, the reaction time needs to be greater than or equal to about 24 hours, in general. It is confirmed that the non-hydrolytic sol-gel reaction may significantly shorten time required for preparing a composition for a composite and for preparing the composite. When the oligo silica compound is prepared by the non-hydrolytic sol-gel reaction, the composition including the oligo silica compound does not include water and a solvent for the sol-gel reaction. Thus, the viscosity decrease of the composition due to water and solvent does not occur, so the productivity is improved in the process of preparing a composite, and the handling of the composition becomes convenient.

On the contrary, when including the oligo silica compound obtained by the hydrolytic sol-gel reaction, the final composition unavoidably includes water. The polyamic acid, which is a precursor of polyimide, is sensitive to the presence of moisture. Particularly, when the polyamic acid is heated in the presence of moisture, the main chain is decomposed to decrease the molecular weight of the polyimide in the final polymer composite, which may cause property deterioration of a molded article (e.g., film) including the obtained polymer composite. In addition, when the amount of the organo silica precursor obtained by the hydrolytic sol-gel reaction is increased, the final composition may include the further increased amount of water. The increased amount of water causes the viscosity decrease of the polyamic acid solution, which is disadvantageous in terms of productivity and handling performance.

In the non-limiting example, referring to FIG. 1, the hydroxy group of silanediol and the alkoxy group of alkoxysilane undergo a non-hydrolytic condensation reaction (e.g., with alcohol discharging) to form a cross-linked silica precursor. The non-hydrolytic condensation reaction may be performed in the presence of a metal hydroxide catalyst. Non-limiting examples of the metal hydroxide catalyst may include barium hydroxide, strontium hydroxide, or the like. The catalyst may be included in an amount of about 0.0001 to about 10 mole percent (mol %), but is not limited thereto. The non-hydrolytic condensation reaction may be performed for greater than or equal to about 10 minutes, for example, for about 30 minutes to about 5 hours, but is not limited thereto. The reaction temperature may be greater than or equal to about 0° C. to less than or equal to about 200° C., but is not limited thereto. For example, the reaction may be performed at room temperature. Alcohol obtained by the condensation reaction may be removed by an appropriate method (e.g., vacuum evaporation or the like) before mixing with the modified polyamic acid.

The modified polyamic acid is mixed with an oligo silica compound (formed by non-hydrolytic condensation reaction) to provide a composition. The obtained composition may be processed into a film or the like and may be dried. The drying may be performed at a temperature of about 50° C. to about 200° C., but is not limited thereto. The drying may be performed under a nitrogen atmosphere, but is not limited thereto. The composition is selectively dried and cured to provide a polyimide composite in which organosilica (e.g., nanoparticles thereof) is dispersed. During the selective drying and curing, the polyamic acid is transformed to a polyimide, and the oligo silica compound may form a silica network. Particularly, the reactive group (e.g., alkoxy group or hydroxy group) of the organo silica precursor is reacted with alkoxysilane of the polyamic acid terminal end to form a cross-linking bond.

Thereby, another embodiment relates to a polyimide composite including a cured product of the composition.

The curing a composition may be performed by heating the composition to a temperature sufficient to induce imidization of polyamic acid. The temperature may be greater than or equal to about 50° C., for example, in a range of about 80° C. to about 400° C., but is not limited thereto. The curing may be performed under a nitrogen atmosphere, but is not limited thereto. The composition may solve the problems of deteriorating transmittance during the high temperature curing, and the composite obtained by the curing may have improved transparency, a decreased coefficient of thermal expansion, and improved heat resistance to even a greater extent than the composition including the oligo silica compound which is a hydrolytic sol-gel reaction product. Particularly, even when a low amount of silica is included in the composite, the above effects may be obtained.

According to an embodiment, the cured product does not include silica particles having a longest diameter of greater than or equal to about 200 nanometers (even a longest diameter of greater than or equal to about 150 nm) when observed by a transmission electron microscope (TEM). According to an embodiment, the cured product does not include a domain (e.g., a particle) of oligo silica separated from the polyimide matrix when observed by a transmission electron microscope. In the polyimide composite, the Si content may range, for example, from about 4 percent by weight (wt %) to about 14 wt % based on the total weight of the composite. When including Si within the range, the composite may have improved optical properties such as transmittance, yellow index, and haze. The polyimide composite may have transmittance of greater than or equal to about 65%, for example, greater than or equal to about 68% for light having a wavelength of about 430 nm, and the haze is less than or equal to about 1%, for example, less than or equal to about 0.5%. In some embodiments, the polyimide composite may have a light transmittance of 70% or higher, an yellow index of 12 or lower, and a haze of 5% or lower at the same time.

In addition, the composite may have significantly improved heat resistance at a high temperature of greater than about 300° C., for example, around 400° C. Thus, the composite may solve the problems of deteriorating optical characteristics and physical characteristics in the following high temperature process. For example, the polyimide composite may have a coefficient of thermal expansion (CTE) of less than or equal to about 150 parts per million per degree Centigrade (ppm/° C.), for example, less than or equal to about 130 ppm/° C. which is obtained by heating a specimen from about 30° C. to about 400° C. at a rate of about 10 degrees Centigrade per minute (° C./min) under a load of about 0.05 Newtons (N).

In another embodiment, a film includes the polyimide composite.

In another embodiment, an electronic device includes the film. The film may be used as a substrate, a dielectric film, an insulating film, a planarization film, a protective film, and the like.

The electronic device may be a flat panel display, a touch panel, a solar cell, an e-window, a heat mirror, a transparent transistor, a flexible display, a complementary metal oxide semiconductor sensor, or a light emitting diode illuminator.

Hereinafter, the embodiments are illustrated in more detail with reference to examples. These examples, however, are not in any sense to be interpreted as limiting the scope of this disclosure.

EXAMPLES

I. Preparation of Composition and Composite

Example 1

[1] Preparation of Poly(Amic Acid)

N-methyl-2-pyrrolidone (NMP) is introduced into a reactor under a nitrogen atmosphere. 2,2'-bis(trifluoromethyl)-4,4'-biphenyldiamine (TFDB) is added into the reactor and dissolved to provide a TFDB solution. 3,3',4,4'-biphenyltetracarboxylic dianhydride (BPDA) are added into the TFDB solution in such an amount that a molar ratio of TFDB with respect to BPDA (TFDB/BPDA) is between about 0.9 and about 0.99 and reacted at about 25° C. for about 48 hours to provide polyamic acid.

[2] End-Capped Aminoalkyl Siloxane

Gamma-aminopropyltrimethoxysilane is added into the solution including polyamic acid obtained from item [1] and agitated at 25° C. to cap an anhydride end of the polyamic acid with alkoxysilane. Gamma-aminopropyltrimethoxysilane is added at 2.0-2.3 times the molar amount difference between diamine and dianhydride for preparing the polyamic acid.

[3] Preparation of Reactive Oligo Silica Compound (Through Non-Hydrolytic Condensation Reaction)

10 grams (0.066 mol) of tetramethoxysilane and 3.57 grams (0.0165 mol) of diphenyl silanediol are placed into a flask, and barium hydroxide is added thereto in an amount of 0.2 mole percent (mol %) per mol of tetramethoxysilane and agitated at 80° C. for 5 hours. Using a vacuum evaporator, methanol is removed from the obtained reaction mixture to provide a reactive oligo silica compound.

[4] Preparation of Composition and Preparation of Composite by Curing the Composition The predetermined amount of aminosiloxane-end capped polyamic acid obtained from the item [2] and the predetermined amount of reactive oligo silica compound obtained from the item [3] are mixed and agitated to provide a composition. The amount of Si is 4.3 percent by weight (wt %) in the composition.

The obtained composition is coated on a glass substrate to provide a film, and the obtained film is heated at a temperature of 300° C. for 60 minutes under the nitrogen atmosphere to obtain a polyimide composite including oligo silica.

Examples 2 to 5

Compositions and polyimide composites are prepared in accordance with the same procedure as in Example 1, except that a small amount of aminosiloxane end-capped polyamic acid and a small amount of reactive oligo silica compound are mixed to provide compositions having Si contents respectively shown in Table 1.

Comparative Example 1

A polyimide is prepared in accordance with the same procedure as in Example 1, except that the composition including the aminosiloxane end-capped polyamic acid is prepared without adding the reactive oligo silica compound.

Comparative Example 2 to 3

Compositions and polyimide composites are prepared in accordance with the same procedure as in Example 1, except that a predetermined amount of aminosiloxane end-capped polyamic acid and a predetermined amount of reactive oligo silica compound are mixed to obtain compositions having Si contents shown in Table 1, respectively.

Comparative Example 4

A composition and a polyimide composite are prepared in accordance with the same procedure as in Example 1, except that a predetermined amount of an uncapped polyamic acid and a predetermined amount of reactive oligo silica compound are mixed to obtain the composition having a Si content shown in Table 1.

Comparative Example 5 and Comparative Example 6

Compositions are prepared in accordance with the same procedure as in Example 1, except that a silica precursor obtained from a hydrolytic sol-gel reaction is used instead of the oligo silica compound obtained from the non-hydrolytic sol-gel reaction, and the compositions include silica in the amounts respectively shown in the following Table 1; and a silica-contained polyimide composite is obtained therefrom.

II. Characteristic Analysis and Property Evaluation of Obtained Composite

1. Measurement of Light Transmittance of Composite

The composites obtained from Examples 1 to 5 and Comparative Examples 1 to 6 are analyzed to measure full wavelength transmittance (%) to light having a wavelength of 300 to 800 nanometers (nm) and transmittance (%) to light having a wavelength of 430 nm as follows.

A part of a sample is cut to a width of 50 mm and a length of 50 mm, and transmittance thereof is measured by a spectrophotometer, CM-3600d, manufactured by Minolta.

The results are shown in Table 1.

2. Measurement of Yellow Index of Composite

The composites obtained from Examples 1 to 5 and Comparative Examples 1 to 6 are analyzed to measure a yellow index (YI) according to the following method.

A part of a sample is cut to a width of 50 millimeters (mm) and a length of 50 mm, and the yellow index thereof is measured using a spectrophotometer, CM-3600d, manufactured by Minolta.

The results are shown in Table 1.

3. Measurement of Haze of Composite

The composites obtained from Examples 1 to 5 and Comparative Examples 1 to 6 are analyzed to measure haze according to the following method.

A part of a sample is cut to a width of 50 mm and a length of 50 mm, and the haze thereof is measured using a spectrophotometer, CM-3600d, manufactured by Minolta.

The results are shown in Table 1.

4. Measurement of Coefficient of Thermal Expansion of Composite

The composites obtained from Examples 1 to 3 and Comparative Example 1 are analyzed to measure a coefficient of thermal expansion (CTE) according to the following method.

A part of a sample is cut to a width of 5 mm and a length of 30 mm and are analyzed to measure a coefficient of thermal expansion (CTE) using a thermal mechanical analysis apparatus, Q400, manufactured by TA. The sample is hold on a quartz hook and applied with force of 0.050 Newton, and then heated from 30° C. to 400° C. at a rate of 10 degree Centigrade per minute (° C./min) under a nitrogen atmosphere. The coefficient of thermal expansion is obtained within a range from 50° C. to 400° C.

Figure 2:
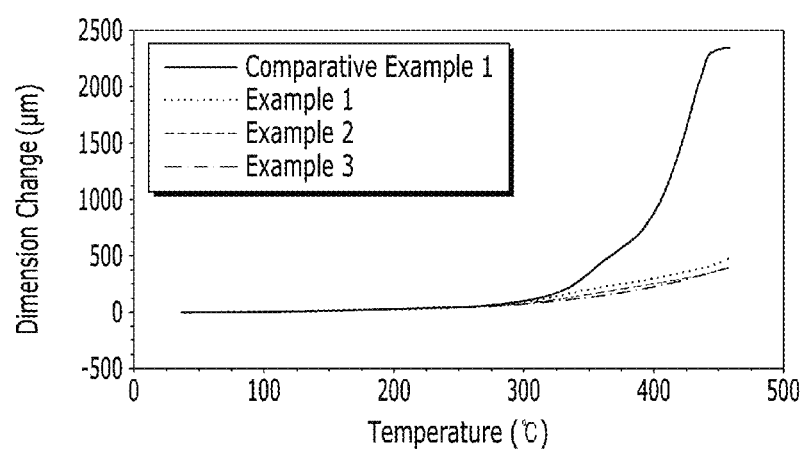
FIG. 2 is a graph of dimension change (micrometers, μm) versus temperature (degree Centigrade, ° C.) showing thermomechanical analysis results of a polyimide according to Comparative Example 1 and polyimide composites according to Examples 1 to 3.

The results are shown in FIG. 2 and Table 2.

5. Transmission Electron Microscope Analysis of Composite

Figure 3:
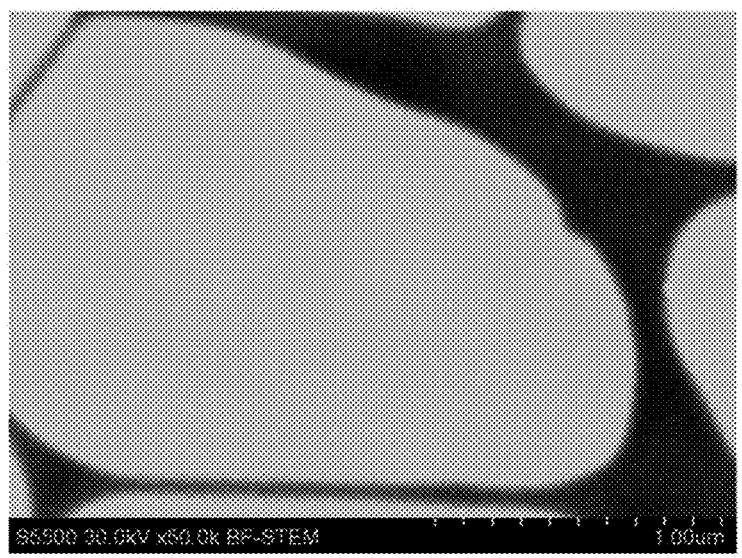
FIG. 3 is a transmission electron microscope image showing polyimide composite according to Example 4.
Figure 4:
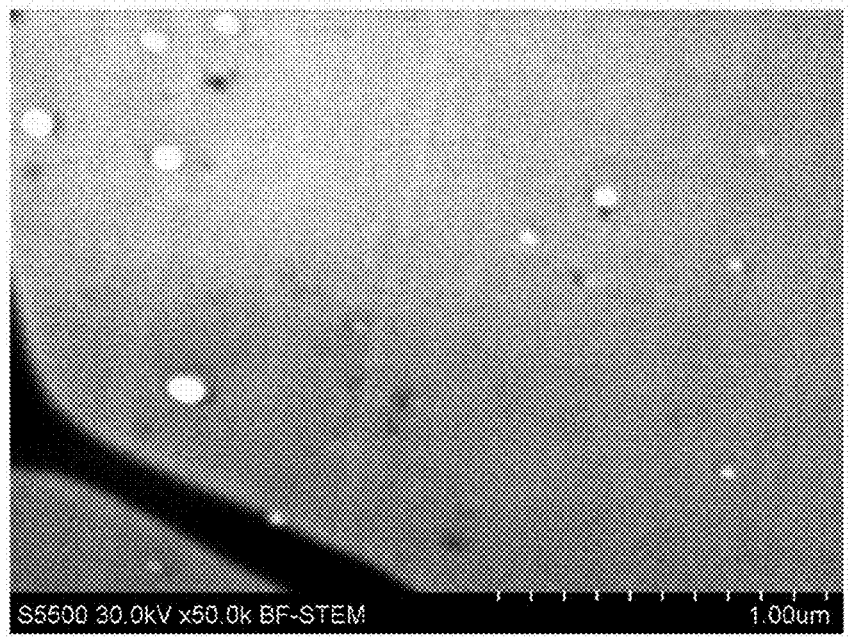
FIG. 4 is a transmission electron microscope image showing polyimide composite according to Comparative Example 5.

The composite obtained from Example 4 and the composite obtained from Comparative Example 4 are analyzed with a transmission electron microscope using a Tecnai G2 device manufactured by FET, and the results are shown in FIG. 3 and FIG. 4.

TABLE 1

| | Si content* (wt %) | Transmittance (%) Total | Transmittance (%) @430 nm | YI | Haze (%) |
|---|---|---|---|---|---|
| Comparative Example 1 | 0 | 84 | 63 | 17.3 | 0.5 |
| Example 1 | 4.3 | 86 | 72 | 11.4 | 0.3 |
| Example 2 | 8.3 | 86 | 72 | 11.3 | 0.3 |
| Example 3 | 11.9 | 87 | 78 | 7.2 | 0.2 |
| Example 4 | 13.9 | 88 | 80 | 6.9 | 0.3 |
| Example 5 | 14.9 | 86 | 75 | 8.9 | 2.5 |

TABLE 1-continued

| | Si content* (wt %) | Transmittance (%) Total | Transmittance (%) @430 nm | YI | Haze (%) |
|---|---|---|---|---|---|
| Comparative Example 2 | 15.3 | 73 | 56 | 15.5 | 43.1 |
| Comparative Example 3 | 18.4 | 58 | 45 | 18.9 | 98.5 |
| Comparative Example 4 | 13.9 | 86 | 71 | 14.1 | 0.9 |
| Comparative Example 5 | 20 | 86 | 66 | 14.7 | 0.4 |
| Comparative Example 6 | 25 | 86 | 72 | 10.3 | 0.6 |

Note *:
The Si content refers to the amount of Si atoms derived from the oligo silica compound.

The results of Table 1 show that the composites according to Examples 1 to 5 may have improved optical properties, compared to the composites prepared according to Comparative Examples 1 to 6. For example, the composites according to Example 1 and Example 4 have Si contents of 4.3% and 13.9%, respectively, but have transmittances (at 430 nm) which are improved by about 14% and about 27% compared to the composite according to Comparative Example 1. On the other hand, the composite according to Comparative Example 6 has a Si content of 25 wt % but has transmittance (at 430 nm) of higher than that of Comparative Example 1 by only 10%. In other words, although the composites according to Examples 1 to 5 include decreased contents of silica, the composites have the improved optical properties, such as higher transmittance (even in a short wavelength region), so the optical properties of the composite may be improved without influencing mechanical properties such as brittleness. The results of Comparative Example 6 confirm that in order for the product obtained by the hydrolysis reaction to realize the optical properties obtained by the Examples using non-hydrolytic reaction, the silica amount to be added is far greater (e.g., at least 3 times higher) than the amount of the silica required for preparing the composite prepared in the Examples.

TABLE 2

| | Si content (wt %) | CTE (ppm/° C.) 50-400° C. |
|---|---|---|
| Comparative Example 1 | 0 | 314.7 |
| Example 1 | 4.3 | 107.7 |
| Example 2 | 8.3 | 91.1 |
| Example 3 | 11.9 | 84.0 |

From the results shown in Table 2 and FIG. 2, it is confirmed that the composites obtained from Examples 1 to 3 have remarkably decreased coefficients of thermal expansion (CTE) compared to the polyimide prepared according to Comparative Example 1 (particularly, during a high temperature heat treatment at 400° C.). Accordingly, the composite may be preferably applied to an optical device (e.g., a transparent substrate or a light transmittance film) in a process including subsequent heat treatment at a high temperature such as an organic LED manufacturing process.

While this disclosure has been described in connection with what is presently considered to be practical exemplary embodiments, it is to be understood that the present inventive concept is not limited to the disclosed embodiments, but, on the contrary, is intended to cover various modifications and equivalent arrangements included within the spirit and scope of the appended claims.

What is claimed is:

1. A composition comprising:
   a polyamic acid modified with an alkoxysilane group; and
   an oligo silica compound,
   wherein the polyamic acid modified with an alkoxysilane group comprises a reaction product of (i) a condensation reaction product of an acid anhydride and a diamine, and (ii) a reactive organosilane compound;
   wherein the oligo silica compound comprises a condensation reaction product of an organosilane diol represented by Formula 4 and an alkoxysilane compound; and
   wherein an amount of silicon atoms in the composition is less than or equal to about 15 wt % based on a total weight of solid contents in the composition:

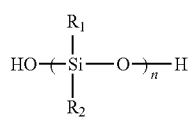

Chemical Formula 4 wherein n is an integer of 1 to 10, and
$R_1$ and $R_2$ are each independently a C1 to C20 alkyl group, a C3 to C8 cycloalkyl group, a C1 to C20 alkyl group substituted with a C3 to C8 cycloalkyl group, a C2 to C20 alkenyl group, a C2 to C20 alkynyl group, or a C6 to C20 aryl group.

2. The composition of claim 1, wherein an amount of water in the composition is equal to or less than about 100 parts per million.

3. The composition of claim 1, wherein the condensation reaction product of an acid anhydride and a diamine comprises a condensation polymerization product of an acid anhydride represented by Chemical Formula 1 and a diamine represented by Chemical Formula 2, and wherein the condensation reaction product of an acid anhydride and a diamine has a functional group capable of reacting with the reactive organosilane compound at at least one terminal end:

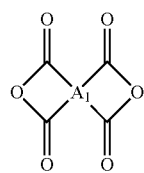

Chemical Formula 1 wherein each $A_1$ is a residual group selected from a substituted or unsubstituted tetravalent C6 to C24 aliphatic cyclic group, a substituted or unsubstituted tetravalent C6 to C24 aromatic cyclic group, or a substituted or unsubstituted tetravalent C4 to C24 hetero aromatic cyclic group, wherein the aliphatic cyclic group, the aromatic cyclic group, or the hetero aromatic cyclic group is present alone, or two or more rings are fused to each other to provide a condensed ring; two or more rings are linked through a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), a C1 to C10 alkylene group having at least one substituent selected from a C1 to C10 linear or branched aliphatic hydrocarbon group, a C1 to C10 fluoroalkyl group, a C6 to C20 aromatic hydrocarbon group, and a C6 to C20 alicyclic hydrocarbon group, —C(CF$_3$)$_2$—, —C(CF$_3$)(C$_6$H$_5$)—, or —C(=O)NH—;

NH$_2$-A$_2$-NH$_2$   Chemical Formula 2 wherein $A_2$ is a substituted or unsubstituted divalent C6 to C24 aliphatic cyclic group, a substituted or unsubstituted divalent C6 to C24 aromatic cyclic group, or a substituted or unsubstituted divalent C4 to C24 hetero aromatic cyclic group, wherein the aliphatic cyclic group, the aromatic cyclic group, or the hetero aromatic cyclic group is present alone, or two or more rings are fused to each other to provide a condensed ring; or two or more rings are linked through a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), a C1 to C10 alkylene group having at least one substituent selected from a C1 to C10 linear or branched aliphatic hydrocarbon group, a C1 to C10 fluoroalkyl group, a C6 to C20 aromatic hydrocarbon group, and a C6 to C20 alicyclic hydrocarbon group, —C(CF$_3$)$_2$—, —C(CF$_3$)(C$_6$H$_5$)—, or —C(=O)NH—.

4. The composition of claim 3, wherein $A_1$ in Chemical Formula 1 is represented by any of chemical formulae:

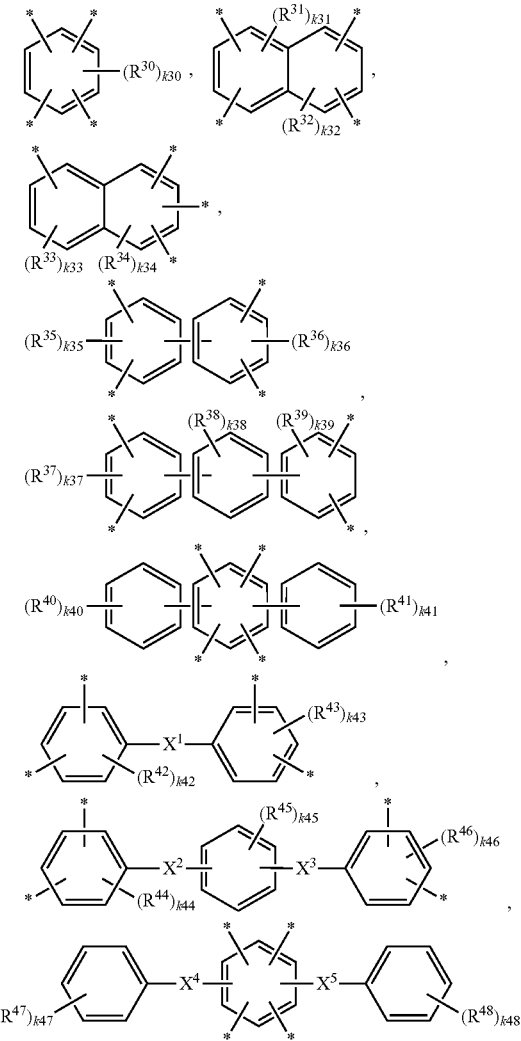

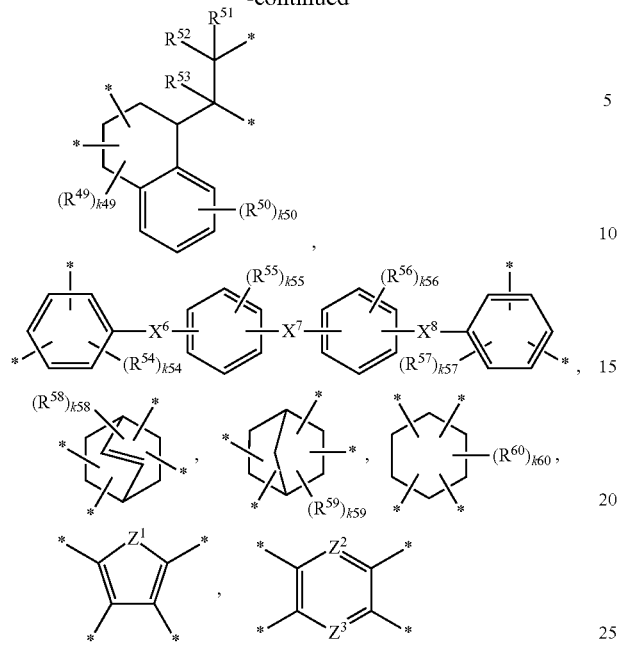

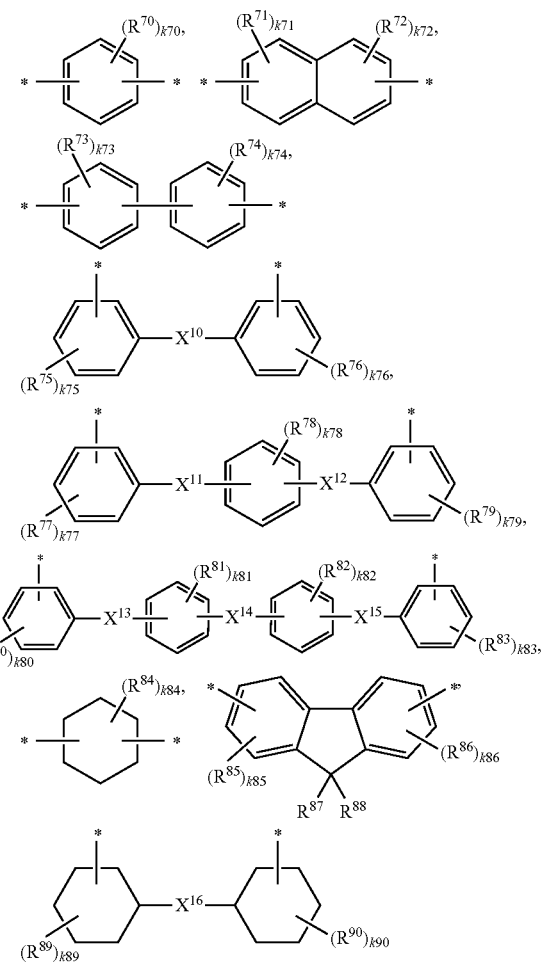

wherein,
- $X^1$ to $X^8$ are the same or different and are independently a single bond, —O—, —S—, —C(=O)—, —CH(OH)—, —S(=O)$_2$—, —Si(CH$_3$)$_2$—, —(CH$_2$)$_p$— wherein $1 \leq p \leq 10$, —(CF$_2$)$_q$— wherein $1 \leq q \leq 10$, —C(CH$_3$)$_2$—, —C(CF$_3$)$_2$—, or —C(=O)NH—,
- $Z^1$ is —O—, —S—, or —NR$^{300}$—, wherein R$^{300}$ is hydrogen or a C1 to C5 alkyl group,
- $Z^2$ and $Z^3$ are the same or different and are independently —N= or —C(R$^{301}$)= wherein R$^{301}$ is hydrogen or a C1 to C5 alkyl group, provided that $Z^2$ and $Z^3$ are not simultaneously —C(R$^{301}$)=,
- R$^{30}$ to R$^{50}$ and R$^{54}$ to R$^{60}$ are the same or different and are independently halogen, a substituted or unsubstituted C1 to C10 aliphatic organic group, or a substituted or unsubstituted C6 to C20 aromatic organic group,
- R$^{51}$ to R$^{53}$ are the same or different and are independently hydrogen, a halogen, a substituted or unsubstituted C1 to C10 aliphatic organic group, or a substituted or unsubstituted C6 to C20 aromatic organic group,
- k30, k31, and k32 are independently integers ranging from 0 to 2,
- k33, k35, k36, k37, k39, k42, k43, k44, k46, k54, and k57 are independently integers ranging from 0 to 3,
- k34 is an integer of 0 or 1,
- k38, k45, k50, k55, and k56 are independently integers ranging from 0 to 4,
- k40, k41, k47, k48, and k49 are independently integers ranging from 0 to 5,
- k58, k59, and k60 are independently integers ranging from 0 to 8, and
- * indicates a point where they are linked to carbon of the carbonyl group.

5. The composition of claim 3, wherein A$_2$ in Chemical Formula 2 is represented by any of chemical formulae:

wherein,
- $X^{10}$ to $X^{16}$ are the same or different and are independently a single bond, —O—, —S—, —C(=O)—, —CH(OH)—, —S(=O)$_2$—, —Si(CH$_3$)$_2$—, —(CH$_2$)$_p$— wherein $1 \leq p \leq 10$, —(CF$_2$)$_q$— wherein $1 \leq q \leq 10$, —C(CH$_3$)$_2$—, —C(CF$_3$)$_2$—, or —C(=O)NH—,
- R$^{70}$ to R$^{86}$ and R$^{89}$ to R$^{90}$ are the same or different and are independently a halogen, a substituted or unsubstituted C1 to C10 aliphatic organic group, or a substituted or unsubstituted C6 to C20 aromatic organic group,
- R$^{87}$ and R$^{88}$ are the same or different and are independently hydrogen, a halogen, a substituted or unsubstituted C1 to C10 aliphatic organic group, or a substituted or unsubstituted C6 to C20 aromatic organic group,
- k70, k73, k74, k75, k76, k77, k78, k79, k80, k81, k82, and k83 are independently integers ranging from 0 to 4,
- k71, k72, k85, and k86 are independently integers ranging from 0 to 3,
- k84, k89, and k90 are independently integers ranging from 0 to 10, and
- * indicates a point where they are linked to nitrogen.

6. The composition of claim 1, wherein the condensation reaction product of an acid anhydride and a diamine comprises a condensation polymerization product of
at least one acid anhydride selected from 3,3',4,4'-biphenyl tetracarboxylic dianhydride, bicyclo[2.2.2]oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride, 4,4'-oxydiphthalic anhydride, pyromellitic dianhydride, 4-(2,5-dioxotetrahydrofuran-3-yl)-1,2,3,4-tetrahydronaphthalene-1,2-dicarboxylic anhydride, 1,2,4,5-benzene tetracarboxylic dianhydride, 1,2,3,4-benzene tetracarboxylic dianhydride, 1,4-bis(2,3-dicarboxyphenoxy) benzene dianhydride, 1,3-bis(3,4-dicarboxyphenoxy) benzene dianhydride, 1,2,4,5-naphthalene tetracarboxylic dianhydride, 1,2,5,6-naphthalene tetracarboxylic dianhydride, 1,4,5,8-naphthalene tetracarboxylic dianhydride, 2,3,6,7-naphthalene tetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, 2,2',3,3'-biphenyl tetracarboxylic dianhydride, 4,4'-bis(3,4-dicarboxyphenoxy)biphenyl dianhydride, bis(2,3-dicarboxylphenyl) ether dianhydride, 4,4'-bis(2,3-dicarboxyphenoxy) diphenylether dianhydride, 4,4'-bis(3,4-dicarboxyphenoxy) diphenylether dianhydride, bis(3,4-dicarboxylphenyl) sulfide dianhydride, 4,4'-bis(2,3-dicarboxyphenoxy) diphenylsulfide dianhydride, 4,4'-bis(3,4-dicarboxyphenoxy) diphenylsulfide dianhydride, bis(3,4-dicarboxylphenyl) sulfone dianhydride, 4,4'-bis(2,3-dicarboxyphenoxy) diphenylsulfone dianhydride, 4,4'-bis(3,4-dicarboxyphenoxy) diphenylsulfone dianhydride, 3,3',4,4'-benzophenone tetracarboxylic dianhydride, 2,2',3,3'-benzophenone tetracarboxylic dianhydride, 2,3,3'4'-benzophenone tetracarboxylic dianhydride, 4,4'-bis(3,4-dicarboxyphenoxy) benzophenone dianhydride, bis(2,3-dicarboxylphenyl) methane dianhydride, bis(3,4-dicarboxylphenyl) methane dianhydride, 1,1-bis(2,3-dicarboxylphenyl) ethane dianhydride, 1,1-bis(3,4-dicarboxylphenyl) ethane dianhydride, 1,2-bis(3,4-dicarboxylphenyl) ethane dianhydride, 2,2-bis(2,3-dicarboxylphenyl) propane dianhydride, 2,2-bis(3,4-dicarboxylphenyl) propane dianhydride, 2,2-bis[4-(2,3-dicarboxyphenoxy) phenyl]propane dianhydride, 2,2-bis[4-(3,4-dicarboxyphenoxy) phenyl]propane dianhydride, 4-(2,3-dicarboxyphenoxy)-4'-(3,4-dicarboxyphenoxy) diphenyl-2,2-propane dianhydride, 2,2-bis[4-(3,4-dicarboxyphenoxy-3,5-dimethyl) phenyl] propane dianhydride, 2,3,4,5-thiophene tetracarboxylic dianhydride, 2,3,5,6-pyrazine tetracarboxylic dianhydride, 1,8,9,10-phenanthrene tetracarboxylic dianhydride, 3,4,9,10-perylene tetracarboxylic dianhydride, 1,3-bis(3,4-dicarboxylphenyl)hexafluoropropane dianhydride, 1,1-bis(3,4-dicarboxylphenyl)-1-phenyl-2,2,2-trifluoroethane dianhydride, 2,2-bis[4-(3,4-dicarboxyphenoxy) phenyl]hexafluoropropane dianhydride, 1,1-bis[4-(3,4-dicarboxyphenoxy) phenyl]-1-phenyl-2,2,2-trifluoroethanedianhydride, and 4,4'-bis[2-(3,4-dicarboxylphenyl)hexafluoroisopropyl]diphenyl ether dianhydride, and a combination thereof; and at least one diamine selected from bistrifluoromethyl-diaminophenyl, m-phenylene diamine, p-phenylene diamine, 1,3-bis(4-aminophenyl) propane, 2,2-bis(4-aminophenyl) propane, 4,4'-diamino-diphenyl methane, 1,2-bis(4-aminophenyl) ethane, 1,1-bis(4-aminophenyl) ethane, 2,2'-diamino-diethyl sulfide, bis(4-aminophenyl) sulfide, 2,4'-diamino-diphenyl sulfide, bis(3-aminophenyl) sulfone, 4,4'-diamino-dibenzyl sulfoxide, bis(4-aminophenyl) ether, bis(3-aminophenyl) ether, bis(4-aminophenyl)diethyl silane, bis(4-aminophenyl) diphenyl silane, bis(4-aminophenyl) ethyl phosphine oxide, bis(4-aminophenyl) phenyl phosphine oxide, bis(4-aminophenyl)-N-phenyl amine, bis(4-aminophenyl)-N-methylamine, 1,2-diamino-naphthalene, 1,4-diamino-naphthalene, 1,5-diamino-naphthalene, 1,6-diamino-naphthalene, 1,7-diamino-naphthalene, 1,8-diamino-naphthalene, 2,3-diamino-naphthalene, 2,6-diamino-naphthalene, 1,4-diamino-2-methyl-naphthalene, 1,5-diamino-2-methyl-naphthalene, 1,3-diamino-2-phenyl-naphthalene, 4,4'-diamino-biphenyl, 3,3'-diamino-biphenyl, 3,3'-dichloro-4,4'-diamino-biphenyl, 3,3'-dimethyl-4,4'-diamino-biphenyl, 3,4'-dimethyl-4,4'-diamino-biphenyl, 3,3'-dimethoxy-4,4'-diamino-biphenyl, 4,4'-bis(4-aminophenoxy)-biphenyl, 2,4-diamino-toluene, 2,5-diamino-toluene, 2,6-diamino-toluene, 3,5-diamino-toluene, 1,3-diamino-2,5-dichloro-benzene, 1,4-diamino-2,5-dichloro-benzene, 1-methoxy-2,4-diamino-benzene, 1,4-diamino-2-methoxy-5-methyl-benzene, 1,4-diamino-2,3,5,6-tetramethyl-benzene, 1,4-bis(2-methyl-4-amino-pentyl)-benzene, 1,4-bis(1,1-dimethyl-5-amino-pentyl)-benzene, 1,4-bis(4-aminophenoxy)-benzene, o-xylylene diamine, m-xylylene diamine, p-xylylene diamine, 3,3'-diamino-benzophenone, 4,4'-diamino-benzophenone, 2,6-diamino-pyridine, 3,5-diamino-pyridine, 1,3-diamino-adamantane, bis[2-(3-aminophenyl)hexafluoroisopropyl]diphenyl ether, 3,3'-diamino-1,1,1'-diadamantane, N-(3-aminophenyl)-4-aminobenzamide, 4-aminophenyl-3-aminobenzoate, 2,2-bis(4-aminophenyl) hexafluoropropane, 2,2-bis(3-aminophenyl) hexafluoropropane, 2-(3-aminophenyl)-2-(4-aminophenyl)hexafluoropropane, 2,2-bis[4-(4-aminophenoxy)phenyl] hexafluoropropane, 2,2-bis[4-(2-chloro-4-aminophenoxy)phenyl hexafluoropropane, 1,1-bis(4-aminophenyl)-1-phenyl-2,2,2-trifluoroethane, 1,1-bis[4-(4-aminophenoxy)phenyl]-1-phenyl-2,2,2-trifluoroethane, 1,4-bis(3-aminophenyl) buta-1-ene-3-yne, 1,3-bis(3-aminophenyl) hexafluoropropane, 1,5-bis(3-aminophenyl) decafluoropentane, 4,4'-bis[2-(4-aminophenoxyphenyl) hexafluoroisopropyl] diphenyl ether, diaminocyclohexane, bicyclohexyldiamine, 4,4'-diaminocyclohexylmethane, diaminofluorene, 1,1-bis(4-aminophenyl)cyclohexane, 4,4'-(Hexafluoroisopropylidene)bis(p-phenyleneoxy)dianiline, 9,9-bis(4-aminophenyl)fluorene, and a combination thereof, and wherein the condensation reaction product of an acid anhydride and a diamine has a functional group capable of reacting with the reactive organosilane compound at one terminal end or both terminal ends of the condensation reaction product.

7. The composition of claim 1, wherein the reactive organosilane compound is a compound represented by Chemical Formula 3:

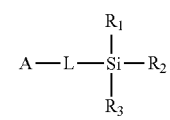

Chemical Formula 3 wherein

L is a single bond, a substituted or unsubstituted a C1 to C12 alkylene, a substituted or unsubstituted C6 to C30 arylene group, a substituted or unsubstituted C1 to C12 heteroalkylene group, or a combination thereof, A is —NH$_2$ or an acid anhydride group, and R$_1$, R$_2$, and R$_3$ are the same or different and each independently a C1 to C6 alkyl group or a C1 to C6 alkoxy group, provided that at least one of R$_1$, R$_2$, and R$_3$ is a C1 to C6 alkoxy group.

8. The composition of claim 7, wherein the reactive organosilane compound is gamma-aminopropyltrimethoxysilane, aminophenyltrimethoxysilane, 3-(triethoxysilyl)propyl succinyl anhydride, or a combination thereof.

9. The composition of claim 1, wherein an amount of the reactive organosilane compound is about 0.01 mole to 10 moles per 1 mole of the alkoxysilane compound.

10. The composition of claim 1, wherein
the alkoxysilane compound is tetramethoxysilane, tetraethoxysilane, or a mixture thereof.

11. The composition of claim 1, wherein the condensation reaction product of an organosilane diol and an alkoxysilane compound is obtained by a non-hydrolytic condensation reaction carried out in the presence of an alkaline-earth metal hydroxide.

12. The composition of claim 1, wherein an amount of the alkoxysilane compound is about 2 to about 10 moles per 1 mole of the organosilane diol.

13. The composition of claim 1, wherein an amount of the oligo silica compound is about 1 to about 10 parts by weight per 100 parts by weight of the polyamic acid modified with alkoxysilane group.

14. A composite comprising a cured product of the composition of claim 1,
wherein the composite has transmittance of greater than or equal to about 65% to light having a wavelength of about 430 nanometers.

15. The composite of claim 14, wherein the cured product does not comprise a silica particle having the longest diameter of greater than or equal to about 200 nanometers and separated from a polyimide matrix when observed with a transmission electron microscope.

16. The composite of claim 14, wherein the cured product does not comprise a silica particle separated from a polyimide matrix when observed with a transmission electron microscope.

17. The composite of claim 14, wherein a content of Si atoms in the composite is about 4% to about 14% based on the total weight of the composite.

18. The composite of claim 14, wherein the composite has haze of less than or equal to about 1%.

19. The composite of claim 14, wherein the composite has a coefficient of thermal expansion of less than or equal to about 150 parts per million per degree Centigrade when a specimen of the composite is heated from about 30° C. to about 400° C. at a rate of about 10 degrees Centigrade per minute under a load of about 0.05 Newtons.

20. A film comprising the composite of claim 14.

21. An electronic device comprising the film of claim 20.

22. A production method of polyimide composite, which comprises:
preparing a polyamic acid by a reaction between an acid dianhydride and a diamine;
reacting the polyamic acid with a reactive organosilane compound to obtain a polyamic acid modified with an alkoxysilane group;
preparing an oligo silica compound by a non-hydrolytic condensation reaction between an organosilane diol represented by Formula 4 and an alkoxy silane compound; and
mixing the polyamic acid modified with an alkoxysilane group and the oligo silica compound and curing the same:

Chemical Formula 4

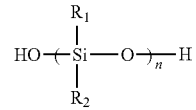

wherein n is an integer of 1 to 10, and

R$_1$ and R$_2$ are each independently a C1 to C20 alkyl group, a C3 to C8 cycloalkyl group, a C1 to C20 alkyl group substituted with a C3 to C8 cycloalkyl group, a C2 to C20 alkenyl group, a C2 to C20 alkynyl group, or a C6 to C20 aryl group.

\* \* \* \* \*